US007854060B2

(12) United States Patent  (10) Patent No.: US 7,854,060 B2
Hirabayashi  (45) Date of Patent: Dec. 21, 2010

(54) MAGNETIC HEAD SUBSTRUCTURE FOR USE FOR MANUFACTURING A MAGNETIC HEAD

(75) Inventor: Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 434 days.

(21) Appl. No.: 11/987,995

(22) Filed: Dec. 6, 2007

(65) Prior Publication Data
US 2009/0144965 A1  Jun. 11, 2009

(51) Int. Cl.
B23P 19/00 (2006.01)
G11C 5/12 (2006.01)
H01M 6/00 (2006.01)
(52) U.S. Cl. .................. 29/737; 29/417; 29/603.07; 29/603.23; 360/121; 360/122; 360/317; 451/5; 451/8; 451/10; 451/36; 451/37
(58) Field of Classification Search .................. 29/417, 29/603.07, 603.09–603.16, 603.18, 603.23, 29/737; 360/121, 122, 317; 451/5, 8, 10, 451/36, 37, 41
See application file for complete search history.

(56) References Cited

U.S. PATENT DOCUMENTS 6,557,241 B1  5/2003  Sasaki
6,807,722 B2 *  10/2004  Sasaki et al. ............. 29/603.09
7,336,442 B2 *  2/2008  Sasaki et al. ........... 360/125.02
2006/0028770 A1  2/2006  Etoh et al.
2006/0044683 A1  3/2006  Matono et al.

FOREIGN PATENT DOCUMENTS

JP  A-2000-251222  9/2000
JP  A-2006-048806  2/2006
JP  A-2006-073088  3/2006

* cited by examiner

Primary Examiner—Paul D Kim
(74) Attorney, Agent, or Firm—Oliff & Berridge, PLC

(57) ABSTRACT

A substructure in which a plurality of pre-head portions are aligned in rows is to be cut later so that the pre-head portions are separated from one another. A surface formed by cutting the substructure is lapped to form medium facing surfaces. The substructure includes a plurality of sensors that respectively show individual sensor values corresponding to values of a plurality of different parameters each of which has an influence on characteristics relating to the pole layer and each of which depends on the position of the medium facing surface. The individual sensor values are resistance values each of which varies according to the position of the medium facing surface. The plurality of sensors are electrically connected to each other to form a composite sensor that shows a composite sensor value, which is a resistance value that depends on the resistance values of the plurality of sensors.

5 Claims, 28 Drawing Sheets

MAGNETIC HEAD SUBSTRUCTURE FOR USE FOR MANUFACTURING A MAGNETIC HEAD

BACKGROUND OF THE INVENTION

1. Field of the Invention

The present invention relates to a method of manufacturing a magnetic head used for writing data on a recording medium, and to a magnetic head substructure used for manufacturing the magnetic head.

2. Description of the Related Art

For magnetic read/write devices such as magnetic disk drives, higher recording density has been constantly required to achieve a higher storage capacity and smaller dimensions. Typically, magnetic heads used in magnetic read/write devices have a structure in which a reproducing (read) head having a magnetoresistive element (that may be hereinafter referred to as an MR element) for reading and a recording (write) head having an induction-type electromagnetic transducer for writing are stacked on a substrate.

For read heads, MR elements in practical use include GMR (giant magnetoresistive) elements utilizing a giant magnetoresistive effect, and TMR (tunneling magnetoresistive) elements utilizing a tunneling magnetoresistive effect.

Write heads include those of a longitudinal magnetic recording system wherein signals are magnetized in a direction along the plane of the recording medium (the longitudinal direction) and those of a perpendicular magnetic recording system wherein signals are magnetized in a direction perpendicular to the plane of the recording medium. Recently, the shift from the longitudinal magnetic recording system to the perpendicular magnetic recording system has been promoted in order to achieve higher recording density of magnetic read/write devices.

For each of the longitudinal magnetic recording system and the perpendicular magnetic recording system, the write head typically includes a coil for generating a magnetic field corresponding to data to be written on the recording medium, and a pole layer for allowing a magnetic flux corresponding to the magnetic field generated by the coil to pass therethrough and generating a write magnetic field for writing the data on the recording medium. The pole layer includes, for example, a track width defining portion including a first end located in a medium facing surface and a second end located away from the medium facing surface, the track width defining portion having a width that defines the optical track width, and a wide portion having a width greater than that of the track width defining portion and coupled to the second end of the track width defining portion. Here, the length of the track width defining portion taken in the direction perpendicular to the medium facing surface is called neck height. The neck height has an influence on the characteristics of the write head. In general, as the neck height gets smaller, magnetic flux of greater magnitude is allowed to be introduced to the medium facing surface through the pole layer, and as a result, the overwrite property, which is a parameter indicating overwriting capability, improves. If the neck height gets too small, however, the effective track width gets too great, which results in noticeable occurrence of problems such as a phenomenon in which, when data is written on a certain track, data stored on a track adjacent thereto is erased (this phenomenon is hereinafter called adjacent track erasing), and unwanted writing between two adjacent tracks. Under the circumstances, when manufacturing magnetic heads it is required that the medium facing surfaces be formed so that the neck height is of a desired value.

An example of a method of manufacturing a magnetic head will now be described. In the method, first, components of a plurality of magnetic heads are formed on a single substrate (wafer) to thereby fabricate a magnetic head substructure in which pre-head portions that are to become the respective magnetic heads later are aligned in a plurality of rows. The substructure includes a plurality of magnetoresistive films (hereinafter referred to as MR films) that are to be lapped later to thereby become the MR elements. Each of the MR films has such a shape that the length taken in the direction perpendicular to the medium facing surface is greater than the length of the MR element and that the width is equal to the width of the MR element. Next, the substructure is cut into a plurality of head aggregates each of which includes a plurality of pre-head portions aligned in a row. Next, a surface formed in each head aggregates by cutting the substructure is lapped to thereby form the medium facing surfaces of the pre-head portions included in each head aggregate. At this time, the MR films are lapped, so that the length thereof becomes a predetermined length and the resistance value thereof becomes a predetermined value, and as a result, the MR films become the MR elements. Next, flying rails are formed in the medium facing surfaces. Next, each head aggregate is cut so that the plurality of pre-head portions are separated from one another, whereby a plurality of magnetic heads are formed.

An example of a method of forming the medium facing surfaces by lapping the head aggregate will now be described. In the method, a plurality of sensors are provided in advance on the substructure, each of the sensors being formed of a resistor layer whose resistance value changes with changing amount of lapping when the head aggregate is lapped later. The resistance value of each of the sensors has a correspondence with the resistance value of the MR element. When the head aggregate is lapped, lapping is performed while detecting the resistance values of the plurality of sensors so that the resistance value of each of the plurality of sensors becomes a predetermined value. As a result, the medium facing surfaces are formed such that the resistance value of each of the plurality of MR elements is equal to the target value and that each of MR heights is equal to the target value. The MR height is the length of the MR element taken in the direction perpendicular to the medium facing surface.

According to conventional methods of manufacturing magnetic heads, the substructure is fabricated such that there is a certain positional relationship between the MR film and the pole layer. Therefore, ideally, if the medium facing surfaces are formed such that the MR heights are of a specific value, neck heights also become uniform. In actuality, however, since the MR film and the pole layer are formed in different steps, there arise variations in positional relationship between the MR film and the pole layer. Furthermore, even if the medium facing surfaces are formed while detecting the resistance value of a sensor having a correspondence with the resistance value of the MR films so that the MR heights are each equal to their target value, the neck heights do not always become equal to their target value. Consequently, according to the conventional methods of manufacturing magnetic heads, there may arise variations in neck height.

Conventionally, in the case of write heads of the longitudinal magnetic recording system, when the recording density is low, variations in neck height do not exert great influences on the characteristics of the write head. However, as the recording density increases, variations in neck height exert greater influences on the characteristics of the write head. In the case of write heads of the perpendicular magnetic recording system, variations in neck height exert greater influences on write characteristics, compared with write heads of the longitudinal magnetic recording system. Because of the foregoing, it has been required recently to reduce variations in neck height so as to obtain desired write characteristics.

To cope with this, as disclosed in JP 2006-048806A and JP 2006-073088A, it has been proposed to provide a sensor for controlling the neck height as well as a sensor for controlling the MR height on a substructure to thereby form the medium facing surfaces such that both of the MR height and the neck height achieve their respective desired values. In this connection, JP 2006-048806A mentions that throat height here means length from the air bearing surface to the point (flare point) at which the width of the track width portion of the main pole begins to widen. The "throat height" mentioned in JP 2006-048806A therefore actually means neck height.

JP 2000-251222A discloses a technique of providing a plurality of elements for monitoring the amount of lapping on a substructure to control throat height, so as to form the medium facing surfaces such that a desired throat height can be obtained.

A parameter that depends on the position of the medium facing surface and that has an influence on the characteristics of the write head is not limited to neck height. For example, throat height mentioned above is also such a parameter. If the values of such a plurality of parameters respectively depend on the positions of different portions to be determined in different steps, there arise variations in mutual relationship between the plurality of parameters. Consequently, for example, even if the medium facing surfaces are formed such that the neck height achieves its desired value, parameters other than neck height will not always achieve their desired values. When there arise variations in mutual relationship between the plurality of parameters, it is impossible to form the medium facing surfaces such that all of the parameters always achieve their desired values, because the values of the plurality of parameters each depend on the position of the medium facing surface. In such a situation, if a lot of magnetic heads are manufactured such that a desired value is achieved for only one of the parameters, such as neck height, magnetic heads falling out of spec due to significant deviation of other parameters from their desired values increase in ratio to all of the magnetic heads manufactured, and the yield of the magnetic heads thus decreases.

OBJECT AND SUMMARY OF THE INVENTION

It is an object of the present invention to provide a method of manufacturing a magnetic head and a magnetic head substructure that can improve the yield of magnetic heads in which there are a plurality of different parameters each of which has an influence on the characteristics of the magnetic head relating to the pole layer and each of which depends on the position of the medium facing surface.

A magnetic head manufactured by the method of the present invention includes: a medium facing surface that faces toward a recording medium; a coil that generates a magnetic field corresponding to data to be written on the recording medium; and a pole layer that allows a magnetic flux corresponding to the magnetic field generated by the coil to pass therethrough and generates a write magnetic field for writing the data on the recording medium.

The method of manufacturing the magnetic head of the present invention includes the steps of: fabricating a magnetic head substructure by forming components of a plurality of magnetic heads on a substrate, the magnetic head substructure including a plurality of pre-head portions aligned in a plurality of rows, each of the pre-head portions being intended to become the magnetic head later; and fabricating the plurality of magnetic heads by separating the plurality of pre-head portions from one another by cutting the substructure.

The step of fabricating the magnetic head substructure includes a plurality of steps of forming a plurality of sensors respectively, the plurality of sensors respectively showing individual sensor values corresponding to values of a plurality of different parameters each of which has an influence on characteristics of the magnetic head relating to the pole layer and each of which depends on the position of the medium facing surface. The step of fabricating the magnetic heads includes the step of forming the medium facing surfaces by lapping a surface formed by cutting the substructure. In the step of forming the medium facing surfaces, lapping is performed so that a composite sensor value that depends on the plurality of individual sensor values shown by the plurality of sensors becomes a predetermined value.

In the method of manufacturing the magnetic head of the present invention, the step of fabricating the magnetic head substructure may include a plurality of steps of respectively determining positions of portions of the magnetic head relating to the values of the respective parameters, and the position of each of the plurality of sensors may be determined in the step of determining the position of the portion relating to the value of the parameter corresponding to the sensor.

In the method of manufacturing the magnetic head of the present invention, the plurality of sensors may respectively show resistance values each of which varies according to the position of the medium facing surface, as the individual sensor values. In this case, in the substructure, the plurality of sensors may be electrically connected to each other to form a composite sensor, and the composite sensor may show a resistance value that depends on the resistance values of the plurality of sensors, as the composite sensor value.

In the method of manufacturing the magnetic head of the present invention, the pole layer may include: a track width defining portion including a first end located in the medium facing surface and a second end located away from the medium facing surface, the track width defining portion having a width that defines the optical track width; and a wide portion coupled to the second end of the track width defining portion and having a width greater than that of the track width defining portion, and one of the plurality of parameters may be the length of the track width defining portion taken in the direction perpendicular to the medium facing surface.

In the method of manufacturing the magnetic head of the present invention, the pole layer may include: a first portion including a first end located in the medium facing surface and a second end located away from the medium facing surface; and a second portion that is coupled to the second end of the first portion and that is greater than the first portion in a dimension taken in the direction parallel to the medium facing surface and perpendicular to the track width direction, and one of the plurality of parameters may be the length of the first portion taken in the direction perpendicular to the medium facing surface.

In the method of manufacturing the magnetic head of the present invention, the magnetic head may be one for use for a perpendicular magnetic recording system.

A magnetic head substructure of the present invention is for use for manufacturing a magnetic head, the magnetic head including a medium facing surface that faces toward a recording medium, a coil that generates a magnetic field corresponding to data to be written on the recording medium, and a pole layer that allows a magnetic flux corresponding to the magnetic field generated by the coil to pass therethrough and generates a write magnetic field for writing the data on the recording medium.

The magnetic head substructure of the present invention includes a substrate, and a plurality of sets of the coil and pole layer formed on the substrate so that a plurality of pre-head portions each of which is to become the magnetic head later are aligned in a plurality of rows. The substructure is intended to be used such that it is cut later to separate the plurality of pre-head portions from one another, and a surface formed by cutting the substructure is lapped to thereby form the medium facing surfaces. The substructure further includes a plurality of sensors that respectively show individual sensor values corresponding to values of a plurality of different parameters each of which has an influence on characteristics of the magnetic head relating to the pole layer and each of which depends on the position of the medium facing surface.

In the magnetic head substructure of the present invention, the magnetic head may include a plurality of portions relating to the values of the respective parameters, and the position of each of the sensors may be associated with the position of the portion relating to the value of the parameter corresponding to the sensor.

In the magnetic head substructure of the present invention, the plurality of sensors may respectively show resistance values each of which varies according to the position of the medium facing surface, as the individual sensor values. In this case, the plurality of sensors may be electrically connected to each other to form a composite sensor, and the composite sensor may show a resistance value that depends on the resistance values of the plurality of sensors, as the composite sensor value.

In the magnetic head substructure of the present invention, the pole layer may include: a track width defining portion including a first end located in the medium facing surface and a second end located away from the medium facing surface, the track width defining portion having a width that defines the optical track width; and a wide portion coupled to the second end of the track width defining portion and having a width greater than that of the track width defining portion, and one of the plurality of parameters may be the length of the track width defining portion taken in the direction perpendicular to the medium facing surface.

In the magnetic head substructure of the present invention, the pole layer may include: a first portion including a first end located in the medium facing surface and a second end located away from the medium facing surface; and a second portion that is coupled to the second end of the first portion and that is greater than the first portion in a dimension taken in the direction parallel to the medium facing surface and perpendicular to the track width direction, and one of the plurality of parameters may be the length of the first portion taken in the direction perpendicular to the medium facing surface.

In the magnetic head substructure of the present invention, the magnetic head may be one for use for a perpendicular magnetic recording system.

According to the method of manufacturing the magnetic head of the present invention, in the step of fabricating the magnetic head substructure, formed are a plurality of sensors that respectively show individual sensor values corresponding to the values of a plurality of different parameters each of which has an influence on the characteristics of the magnetic head relating to the pole layer and each of which depends on the position of the medium facing surface. In the step of forming the medium facing surfaces, lapping is performed so that the composite sensor value that depends on the plurality of individual sensor values shown by the plurality of sensors becomes a predetermined value. As a result, according to the present invention, it is possible to improve the yield of the magnetic heads in which there are a plurality of different parameters each of which has an influence on the characteristics of the magnetic head relating to the pole layer and each of which depends the position of the medium facing surface.

The magnetic head substructure of the present invention includes a plurality of sensors that respectively show individual sensor values corresponding to the values of a plurality of different parameters each of which has an influence on the characteristics of the magnetic head relating to the pole layer and each of which depends on the position of the medium facing surface. As a result, according to the present invention, by forming the medium facing surfaces such that the composite sensor value that depends on the plurality of individual sensor values shown by the plurality of sensors becomes a predetermined value, it is possible to improve the yield of the magnetic head in which there are a plurality of different parameters each of which has an influence on the characteristics of the magnetic head relating to the pole layer and each of which depends the position of the medium facing surface.

Other and further objects, features and advantages of the invention will appear more fully from the following description.

DETAILED DESCRIPTION OF THE PREFERRED EMBODIMENT

Figure 4:
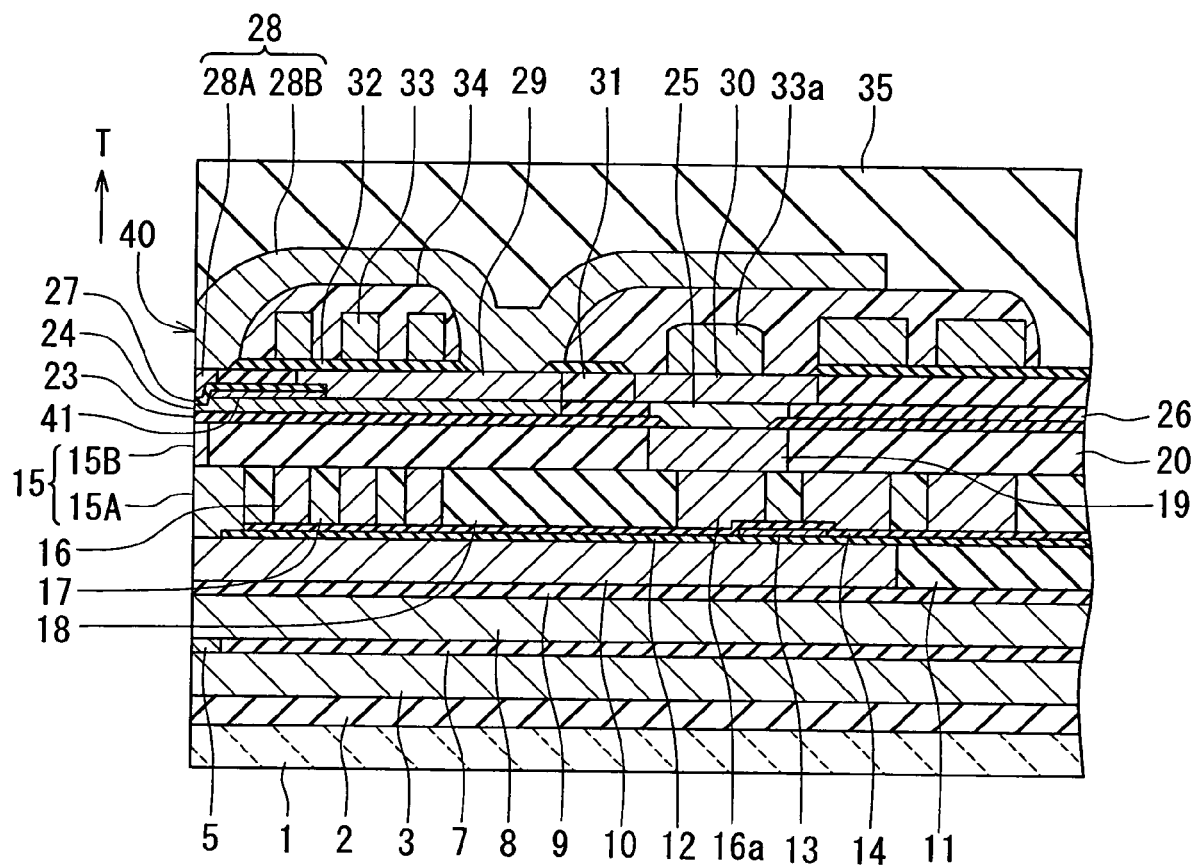
FIG. 4 is a cross-sectional view illustrating the configuration of the magnetic head of the embodiment of the invention.
Figure 5:
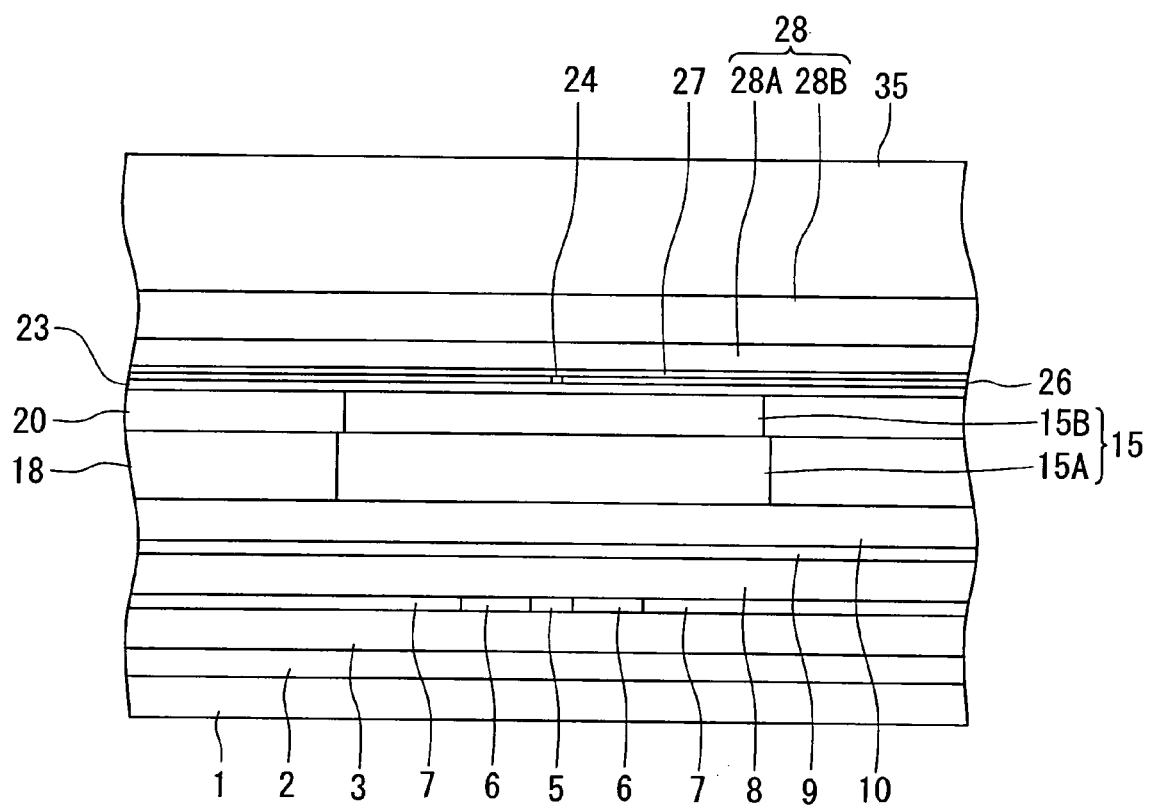
FIG. 5 is a front view of the medium facing surface of the magnetic head of the embodiment of the invention.

An embodiment of the present invention will now be described in detail with reference to the drawings. Reference is first made to FIG. 4 and FIG. 5 to describe the configuration of a magnetic head manufactured by a manufacturing method according to the embodiment. Here is given an example of a magnetic head for a perpendicular magnetic recording system in which a TMR element is employed as the MR element. FIG. 4 is a cross-sectional view illustrating the configuration of the magnetic head. FIG. 5 is a front view of the medium facing surface of the magnetic head. FIG. 4 illustrates a cross section perpendicular to the medium facing surface and the top surface of the substrate. The arrow marked with T in FIG. 4 shows the direction of travel of a recording medium.

As illustrated in FIG. 4, the magnetic head of the embodiment has a medium facing surface 40 that faces toward the recording medium. As illustrated in FIG. 4 and FIG. 5, the magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias magnetic field applying layers 6 disposed adjacent to two sides of the MR element 5, respectively, with insulating films (not shown) respectively disposed therebetween; and an insulating layer 7 disposed around the MR element 5 and the bias magnetic field applying layers 6. The MR element 5 has an end located in the medium facing surface 40. The insulating layer 7 is made of an insulating material such as alumina. The magnetic head further includes: a second read shield layer 8 made of a magnetic material and disposed on the MR element 5, the bias magnetic field applying layers 6 and the insulating layer 7; and a separating layer 9 made of a nonmagnetic material such as alumina and disposed on the second read shield layer 8. The portion from the first read shield layer 3 to the second read shield layer 8 makes up a read head.

The MR element 5 is a TMR element. A sense current for detecting magnetic signals is fed to the MR element 5 in a direction intersecting the plane of each layer constituting the MR element 5, such as the direction perpendicular to the plane of each layer constituting the MR element 5.

The magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina. An end of each of the insulating films 12 and 14 closer to the medium facing surface 40 is located at a distance from the medium facing surface 40. In the example illustrated in FIG. 4, the end of the insulating film 14 closer to the medium facing surface 40 is located farther from the medium facing surface 40 than is the end of the insulating film 12 closer to the medium facing surface 40. On the contrary, however, the end of the insulating film 12 closer to the medium facing surface 40 may be located farther from the medium facing surface 40 than is the end of the insulating film 14 closer to the medium facing surface 40. Alternatively, the end of the insulating film 12 closer to the medium facing surface 40 and the end of the insulating film 14 closer to the medium facing surface 40 may be located such that the respective distances from the medium facing surface 40 are equal.

The magnetic head further includes a first shield 15 disposed on the magnetic layer 10. The first shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example illustrated in FIG. 4, the length of the second layer 15B taken in the direction perpendicular to the medium facing surface 40 is smaller than the length of the first layer 15A taken in the direction perpendicular to the medium facing surface 40. However, the length of the second layer 15B taken in the direction perpendicular to the medium facing surface 40 may be equal to or greater than the length of the first layer 15A taken in the direction perpendicular to the medium facing surface 40.

The magnetic head further includes: a coil 16 made of a conductive material and disposed on the insulating film 14; an insulating layer 17 that fills the space between the coil 16 and the first layer 15A and the space between respective adjacent turns of the coil 16; and an insulating layer 18 disposed around the first layer 15A, the coil 16 and the insulating layer 17. The coil 16 is planar spiral-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The magnetic head further includes: a connecting layer 19 made of a conductive material and disposed on the connecting portion 16a; and an insulating layer 20 made of an insulating material such as alumina and disposed around the second layer 15B and the connecting layer 19. The connecting layer 19 may be made of the same material as the second layer 15B. The second layer 15B, the connecting layer 19 and the insulating layer 20 have flattened top surfaces.

The magnetic head further includes a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The magnetic head further includes: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of the same material as the pole layer 24. The shape of the pole layer 24 will be described in detail later.

The magnetic head further includes a nonmagnetic layer 41 made of a nonmagnetic material and disposed on part of the top surface of the pole layer 24. The nonmagnetic layer 41 is made of an inorganic insulating material or a metal material, for example. Examples of the inorganic insulating material used for the nonmagnetic layer 41 include alumina and $SiO_2$. Examples of the metal material used for the nonmagnetic layer 41 include Ru and Ti. The shape of the nonmagnetic layer 41 will be described in detail later.

The magnetic head further includes a second gap layer 27 disposed on part of the pole layer 24 and on the nonmagnetic layer 41. A portion of the top surface of the pole layer 24 apart from the medium facing surface 40 and the top surface of the connecting layer 25 are not covered with the nonmagnetic layer 41 and the second gap layer 27. The second gap layer 27 is made of a nonmagnetic material such as alumina.

The magnetic head further includes a second shield 28 disposed on the second gap layer 27. The second shield 28 includes: a first layer 28A disposed adjacent to the second gap layer 27; and a second layer 28B disposed on a side of the first layer 28A opposite to the second gap layer 27 and connected to the first layer 28A. The first layer 28A and the second layer 28B are made of a magnetic material. Each of the first layer 28A and the second layer 28B has an end face located in the medium facing surface 40. The shape of the first layer 28A will be described in detail later.

The magnetic head further includes: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of the same material as the first layer 28A. The first layer 28A, the yoke layer 29, the connecting layer 30 and the insulating layer 31 have flattened top surfaces.

The magnetic head further includes an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The magnetic head further includes a coil 33 made of a conductive material and disposed on the insulating layer 32. The coil 33 is planar spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further includes an insulating layer 34 disposed to cover the coil 33. The insulating layer 34 is made of photoresist, for example. The second layer 28B of the second shield 28 is disposed on the first layer 28A, the yoke layer 29 and the insulating layer 34, and connects the first layer 28A and the yoke layer 29 to each other.

The magnetic head further includes an overcoat layer 35 made of an insulating material such as alumina and disposed to cover the second layer 28B. The portion from the magnetic layer 10 to the second layer 28B makes up a write head.

As described so far, the magnetic head includes the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head includes the MR element 5, and the first read shield layer 3 and the second read shield layer 8 that are disposed to sandwich the MR element 5 therebetween. FIG. 4 and FIG. 5 illustrate an example in which the MR element 5 is a TMR element. The first read shield layer 3 and the second read shield layer 8 also function as a pair of electrodes for feeding a sense current to the MR element 5 in a direction intersecting the plane of each layer constituting the MR element 5, such as the direction perpendicular to the plane of each layer constituting the MR element 5. Besides the first read shield layer 3 and the second read shield layer 8, there may be provided another pair of electrodes on top and bottom of the MR element 5, respectively. The MR element 5 has a resistance that changes in response to an external magnetic field, that is, a signal magnetic field sent from the recording medium. The resistance of the MR element 5 can be determined from the sense current. It is thus possible, using the read head, to read data stored on the recording medium.

The MR element 5 is not limited to the TMR element but may be a GMR element. The GMR element may be one having a CIP (current-in-plane) structure in which the sense current is fed in a direction nearly parallel to the plane of each layer constituting the GMR element, or may be one having a CPP (current-perpendicular-to-plane) structure in which the sense current is fed in a direction intersecting the plane of each layer constituting the GMR element, such as the direction perpendicular to the plane of each layer constituting the GMR element. In the case where the MR element 5 is a GMR element having the CIP structure, a pair of electrodes for feeding the sense current to the MR element 5 are respectively provided on both sides of the MR element 5 that are opposed to each other in the width direction, and shield gap films made of an insulating material are respectively provided between the MR element 5 and the first read shield layer 3 and between the MR element 5 and the second read shield layer 8.

The write head includes the magnetic layer 10, the first shield 15, the coil 16, the first gap layer 23, the pole layer 24, the nonmagnetic layer 41, the second gap layer 27, the second shield 28, the yoke layer 29, and the coil 33. The first shield 15 is located closer to the substrate 1 than is the second shield 28. The pole layer 24 is located closer to the substrate 1 than is the second shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the embodiment, the first shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The magnetic layer 10 has a function of returning a magnetic flux that has been generated from the end face of the pole layer 24 and has magnetized the recording medium. FIG. 4 illustrates an example in which the magnetic layer 10 has an end face located in the medium facing surface 40. However, since the magnetic layer 10 is connected to the first shield 15 that has the end face located in the medium facing surface 40, an end face of the magnetic layer 10 closer to the medium facing surface 40 may be located at a distance from the medium facing surface 40.

In the medium facing surface 40, the end face of the first shield 15 (the end face of the second layer 15B) is located backward of the end face of the pole layer 24 along the direction T of travel of the recording medium (that is, located closer to the air-inflow end of the slider) with a specific small distance provided therebetween by the first gap layer 23. The distance between the end face of the pole layer 24 and the end face of the first shield 15 in the medium facing surface 40 is preferably within a range of 0.05 to 0.7 µm, and more preferably within a range of 0.1 to 0.3 µm.

The first shield 15 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the embodiment, the second shield 28 includes: the first layer 28A disposed adjacent to the second gap layer 27; and the second layer 28B disposed on a side of the first layer 28A opposite to the second gap layer 27 and connected to the first layer 28A. Part of the coil 33 is disposed to pass through the space surrounded by the pole layer 24 and the second shield 28. The second shield 28 is connected to a portion of the yoke layer 29 away from the medium facing surface 40. The second shield 28 is thus connected to a portion of the pole layer 24 away from the medium facing surface 40 through the yoke layer 29. The pole layer 24, the second shield 28 and the yoke layer 29 form a magnetic path that allows a magnetic flux corresponding to the magnetic field generated by the coil 33 to pass therethrough.

In the medium facing surface 40, the end face of the second shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 200 nm, and more preferably within a range of 25 to 50 nm, so that the second shield 28 can fully exhibit its function as a shield.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken into the pole layer 24. The second shield 28 also has a function of returning a magnetic flux that has been generated from the end face of the pole layer 24 and has magnetized the recording medium.

FIG. 4 illustrates an example in which neither the magnetic layer 10 nor the first shield 15 is connected to the pole layer 24. However, the magnetic layer 10 may be connected to a portion of the pole layer 24 away from the medium facing surface 40. The coil 16 is not an essential component of the write head and can be dispensed with. In the example illustrated in FIG. 4, the yoke layer 29 is disposed on the pole layer 24, that is, disposed forward of the pole layer 24 along the direction T of travel of the recording medium (that is, disposed closer to the air-outflow end of the slider). However, the yoke layer 29 may be disposed below the pole layer 24, that is, disposed backward of the pole layer 24 along the direction T of travel of the recording medium (that is, disposed closer to the air-inflow end of the slider).

The heater 13 is provided for heating the components of the write head including the pole layer 24 so as to control the distance between the recording medium and the end face of the pole layer 24 located in the medium facing surface 40. Two leads that are not shown are connected to the heater 13. For example, the heater 13 is composed of a NiCr film or a layered film made up of a Ta film, a NiCu film and a Ta film. The heater 13 is energized through the two leads and thereby produces heat, and heats the components of the write head. As a result, the components of the write head expand and the end face of the pole layer 24 located in the medium facing surface 40 thereby gets closer to the recording medium.

Figure 1:
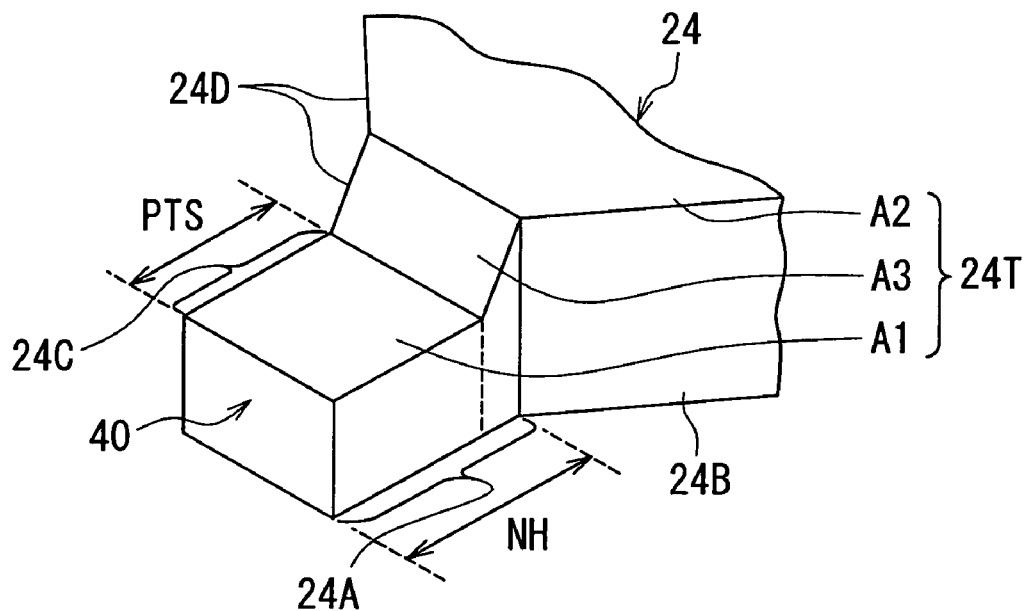
FIG. 1 is a perspective view of a portion of the pole layer near the medium facing surface of a magnetic head of an embodiment of the invention.
Figure 2:
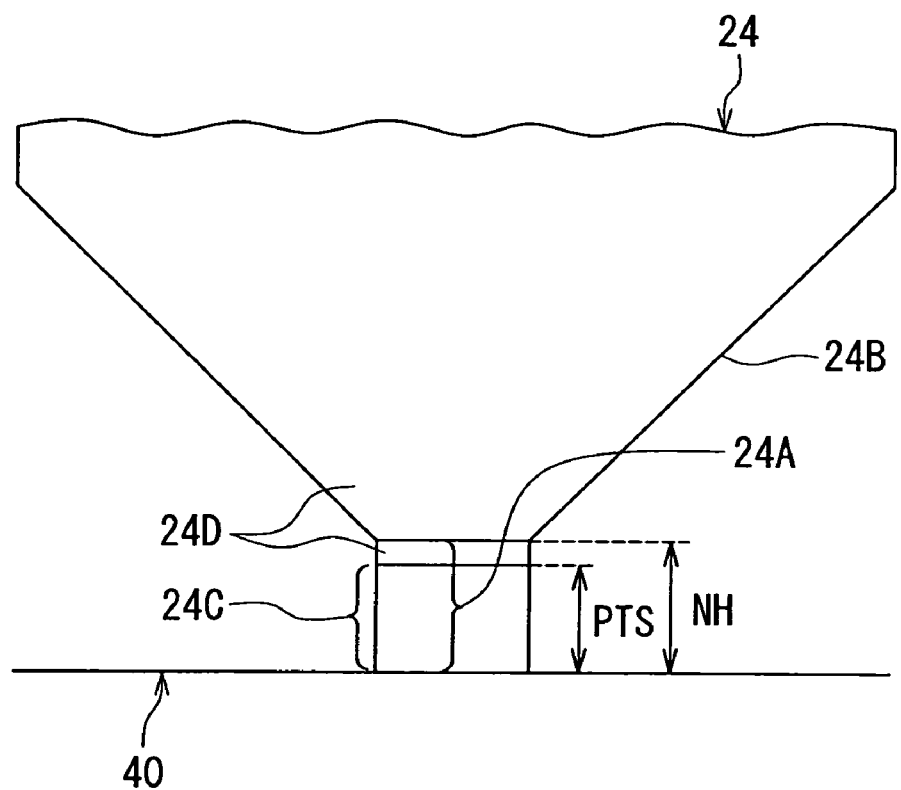
FIG. 2 is a top view of the portion of the pole layer near the medium facing surface of the magnetic head of the embodiment of the invention.
Figure 3:
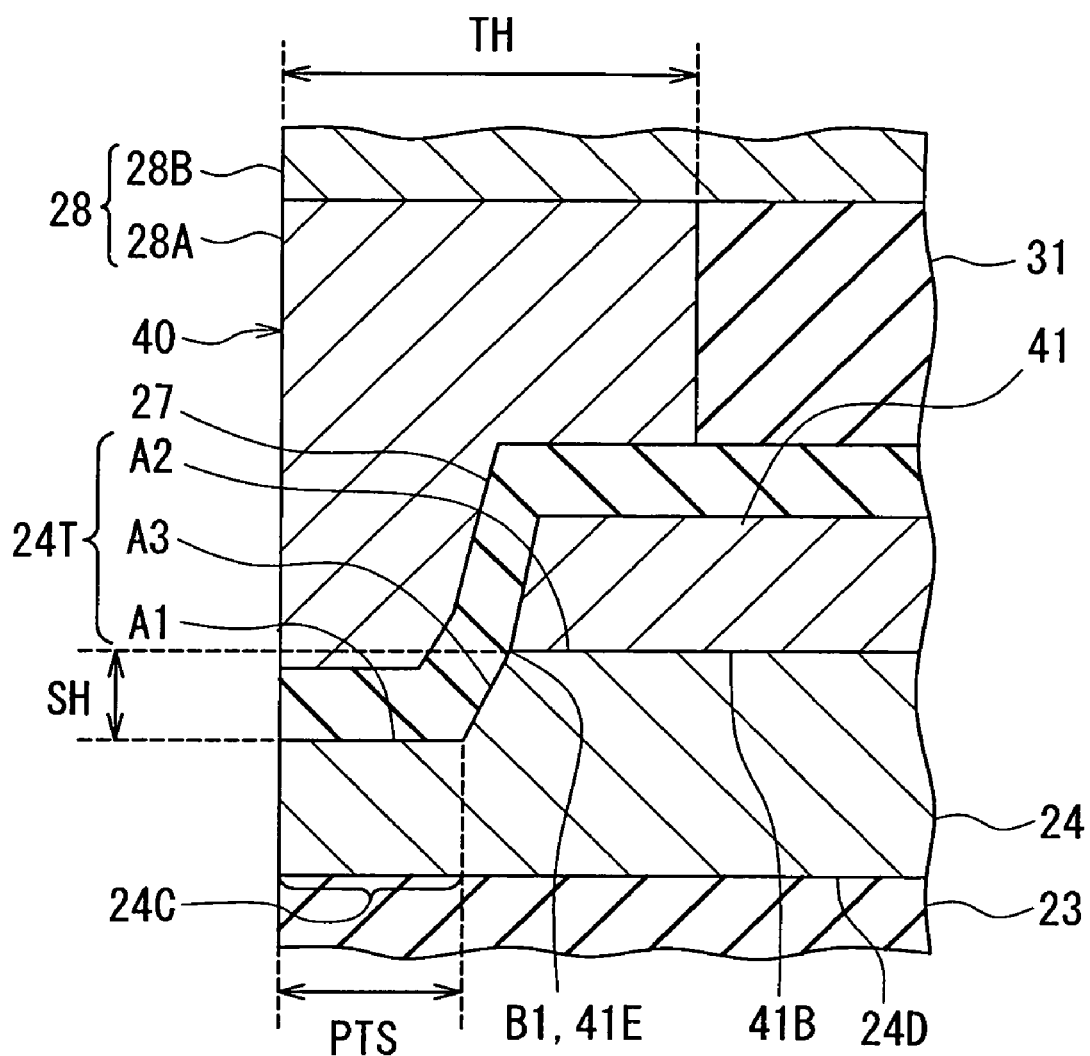
FIG. 3 is a cross-sectional view illustrating a main part of the magnetic head of the embodiment of the invention.

Reference is now made to FIG. 1 to FIG. 3 to describe the pole layer 24, the nonmagnetic layer 41, the second gap layer 27 and the second shield 28 of the embodiment in detail. FIG. 1 is a perspective view of a portion of the pole layer 24 near the medium facing surface 40. FIG. 2 is a top view of the portion of the pole layer 24 near the medium facing surface 40. FIG. 3 is a cross-sectional view illustrating a main part of the magnetic head.

As illustrated in FIG. 1 and FIG. 2, the pole layer 24 includes: a track width defining portion 24A including a first end located in the medium facing surface 40 and a second end located away from the medium facing surface 40, the track width defining portion 24A having a width that defines the optical track width; and a wide portion 24B coupled to the second end of the track width defining portion 24A and having a width greater than that of the track width defining portion 24A. The width of the track width defining portion 24A is nearly uniform. The wide portion 24B is, for example, equal in width to the track width defining portion 24A at the boundary with the track width defining portion 24A, and gradually increases in width with increasing distance from the medium facing surface 40 and then maintains a specific width to the end of the wide portion 24B. Hereinafter, the length of the track width defining portion 24A taken in the direction perpendicular to the medium facing surface 40 is referred to as neck height and is represented by the symbol "NH". NH is within a range of 0.05 to 0.20 μm, for example.

As illustrated in FIG. 1 and FIG. 3, the pole layer 24 has a top surface 24T that is farther from the substrate 1 (see FIG. 4). The top surface 24T includes: a first portion A1 and a second portion A2 with a difference in height therebetween; and a third portion A3 that connects the first portion A1 and the second portion A2 to each other. The first portion A1 has an edge located in the medium facing surface 40. The second portion A2 is located farther from the medium facing surface 40 and farther from the substrate 1 than is the first portion A1. The bottom surface of the pole layer 24 is a flat surface. Consequently, the pole layer 24 includes: a first portion 24C including a first end located in the medium facing surface 40 and a second end located away from the medium facing surface 40; and a second portion 24D that is coupled to the second end of the first portion 24C and that is greater than the first portion 24C in the dimension taken in the direction parallel to the medium facing surface 40 and perpendicular to the track width direction, that is, the dimension taken in the direction in which the plurality of layers constituting the magnetic head are stacked. The boundary between the first portion 24C and the second portion 24D is an imaginary plane that passes through the boundary between the first portion A1 and the third portion A3 and that is parallel to the medium facing surface 40. Here, the length of the first portion 24C taken in the direction perpendicular to the medium facing surface 40 is represented by the symbol "PTS". PTS falls within a range of 0.05 to 0.20 mm, for example. FIG. 1 and FIG. 2 illustrate an example in which PTS is smaller than NH. However, PTS may be equal to NH, or may be greater than NH.

NH and PTS are different parameters each of which has an influence on the characteristics of the magnetic head relating to the pole layer 24 and each of which depends on the position of the medium facing surface 40. Examples of the characteristics of the magnetic head relating to the pole layer 24 include the overwrite property and the effective track width.

As illustrated in FIG. 3, the nonmagnetic layer 41 is disposed between the second portion A2 and the second gap layer 27. An end of the nonmagnetic layer 41 closer to the medium facing surface 40 is located away from the medium facing surface 40. The nonmagnetic layer 41 has a surface 41B that touches the second portion A2, and this surface 41B has an edge 41E located at the boundary B1 between the second portion A2 and the third portion A3.

The second gap layer 27 is disposed to touch the first portion A1 and the third portion A3 of the top surface 24T of the pole layer 24, and to touch the end of the nonmagnetic layer 41 closer to the medium facing surface 40 and the top surface of the nonmagnetic layer 41.

The first layer 28A of the second shield 28 has a surface (bottom surface) that bends to be opposed to the first portion A1, the second portion A2 and the third portion A3 with the second gap layer 27 located in between.

Here, as shown in FIG. 3, the difference in height between the first portion A1 and the second portion A2 is represented by the symbol "SH". To be specific, SH is the difference in height between the edge of the first portion A1 located in the medium facing surface 40 and the boundary B1 between the second portion A2 and the third portion A3, that is, the difference between them in distance from the top surface of the substrate 1.

The thickness of the second gap layer 27, that is, the distance between the end face of the pole layer 24 and the end face of the second shield 28 in the medium facing surface 40, is preferably equal to or smaller than 200 nm, and more preferably within a range of 25 to 50 nm, as previously mentioned. The difference in height SH between the first portion A1 and the second portion A2 is within a range of 30 to 150 nm, for example. The thickness of the nonmagnetic layer 41 is within a range of 50 to 250 nm, for example. The distance between the second portion A2 and the bottom surface of the first layer 28A is within a range of 70 to 300 nm, for example. The "thickness" of each of the layers constituting the magnetic head, such as the second gap layer 27 and the nonmagnetic layer 41, is the dimension taken in the direction in which the plurality of layers constituting the magnetic head are stacked.

In the embodiment, the length of the first layer 28A taken in the direction perpendicular to the medium facing surface 40 is referred to as throat height, and is represented by the symbol "TH". The distance between the pole layer 24 and the second shield 28 taken in a region farther from the medium facing surface 40 than an end of the first layer 28A farther from the medium facing surface 40 is noticeably greater than the distance between the pole layer 24 and the second shield 28 taken in a region closer to the medium facing surface 40 than the end of the first layer 28A farther from the medium facing surface 40. TH is within a range of 0.05 to 0.30 μm, for example. TH and NH may be equal to or different from each other.

Next, a description will now be made on the method of manufacturing the magnetic head according to the embodiment. The method of manufacturing the magnetic head according to the embodiment includes the steps of fabricating a magnetic head substructure by forming components of a plurality of magnetic heads on a substrate, the magnetic head substructure including a plurality of pre-head portions aligned in a plurality of rows, each of the pre-head portions being intended to become the magnetic head later; and fabricating the plurality of magnetic heads by separating the plurality of pre-head portions from one another by cutting the magnetic head substructure.

Figure 6:
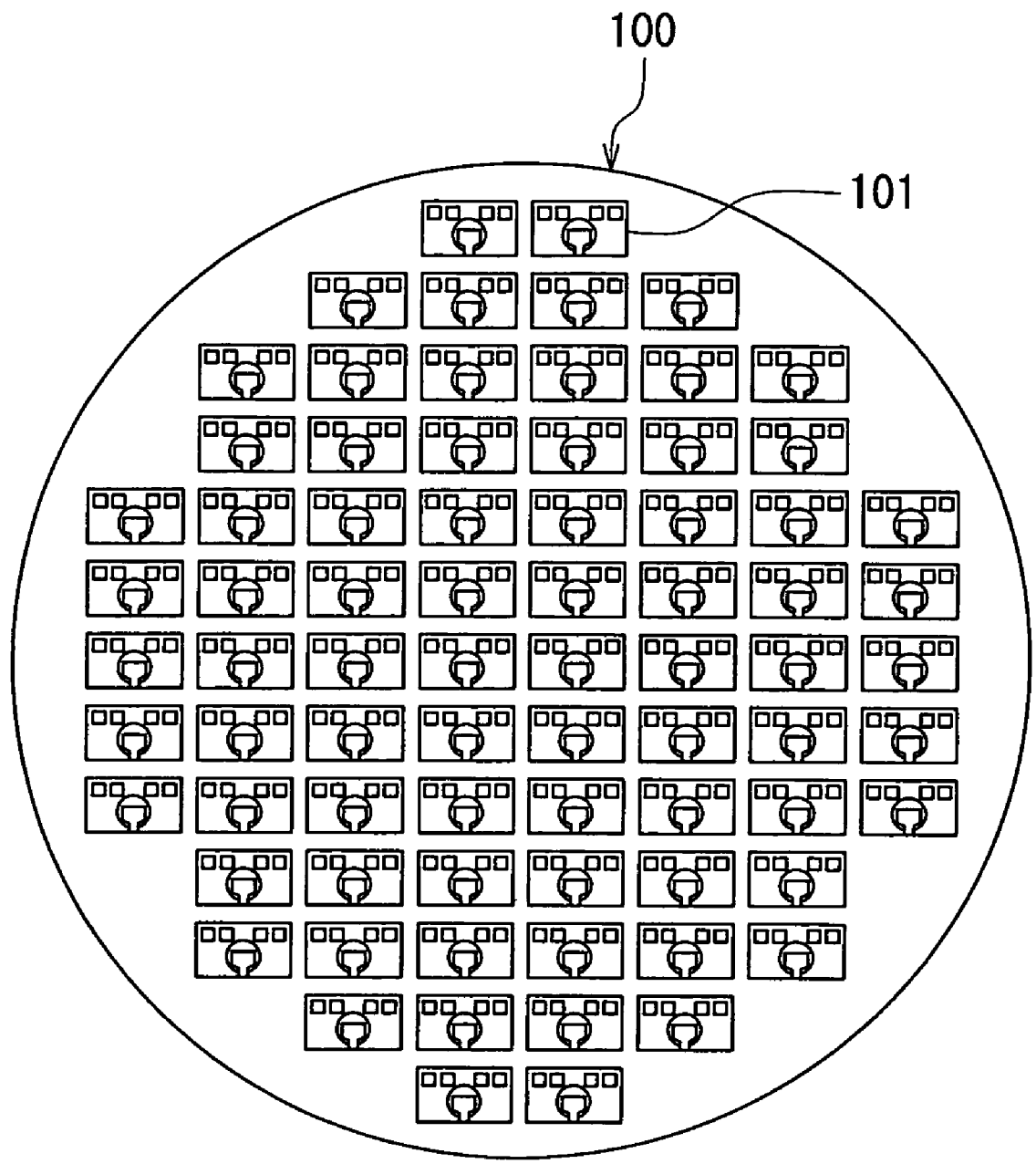
FIG. 6 is a top view of a magnetic head substructure according to the embodiment of the invention.
Figure 7:
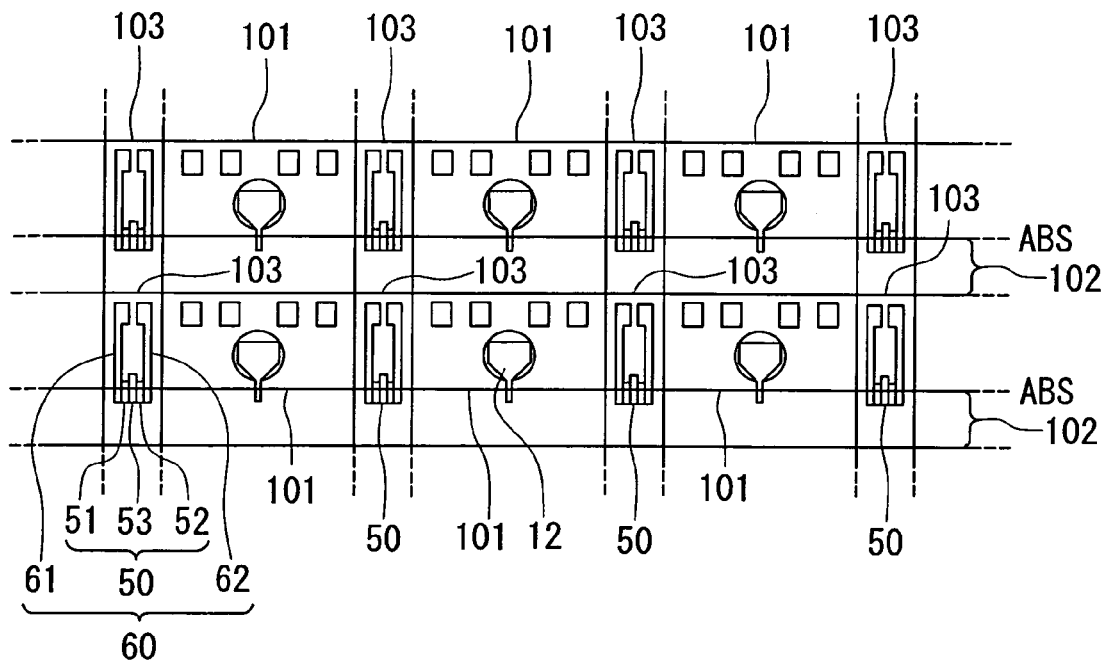
FIG. 7 is an explanatory view illustrating a portion of the magnetic head substructure according to the embodiment of the invention.

FIG. 6 is a top view of the magnetic head substructure. FIG. 7 is an explanatory view illustrating a part of the magnetic head substructure. As illustrated in FIG. 6 and FIG. 7, the magnetic head substructure (hereinafter simply called the substructure) 100 includes a plurality of pre-head portions 101 aligned in a plurality of rows. In FIG. 7 and other figures, the symbol ABS indicates an imaginary plane located at a position where the medium facing surfaces 40 are to be formed. In the embodiment, a group of pre-head portions 101 aligned in the direction parallel to the plane ABS, that is, the horizontal direction in FIG. 7, is called a row.

The substructure 100 further includes: inter-row removal-intended portions 102 located between every adjacent two rows; and intra-row removal-intended portions 103 located between every adjacent two pre-head portions 101 in each row.

The substructure 100 is intended to be used such that it is cut later to separate the plurality of pre-head portions 101 from one another, and a surface formed by cutting the substructure 100 is lapped to thereby form the medium facing surfaces 40.

The substructure 100 further includes a plurality of first sensors 51, a plurality of second sensors 52, a plurality of connecting portions 53, a plurality of first leads 61, and a plurality of second leads 62. Groups of one each of the sensors 51, 52, connecting portions 53 and leads 61, 62 are arranged such that each group lies across an intra-row removal-intended portion 103 and a part of an inter-row removal-intended portion 102 adjacent thereto. Each of the sensors 51 and 52 is a resistor film having a predetermined shape. The connecting portions 53 are conductive and electrically connect the respective sensors 51 to the respective sensors 52.

The leads 61 are conductive and are electrically connected to the respective sensors 51. The leads 62 are conductive and are electrically connected to the respective sensors 52. A lead 61 and a connecting portion 53 are connected to opposite ends of a sensor 51, respectively. Similarly, a lead 62 and a connecting portion 53 are connected to opposite ends of a sensor 52, respectively. Consequently, a lead 61, a sensor 51, a connecting portion 53, a sensor 52 and a lead 62 are connected in series.

A sensor 51 and a lead 61 may be different portions of one conductor layer. Similarly, a sensor 52 and a lead 62 may be different portions of one conductor layer. A connecting portion 53 may be a conductor layer different from sensors 51 and 52, or may be integrated with a sensor 51 or 52. A sensor 51 and a sensor 52 may be in direct contact with each other, and the interface between the sensors 51 and 52 may constitute a connecting portion 53.

Examples of materials employable to form the sensors 51 and 52 include a magnetic material such as NiFe, and Ta and Ru. The sensors 51 and 52 may be each composed of a single-layer film of any one of the above-listed materials, or may be each composed of a multilayer film including one of more of the above-listed materials. Examples of materials employable to form the leads 61 and 62 and the connecting portions 53 include Ta, Ru, Au and AuCu. The leads 61 and 62 and the connecting portions 53 may be each composed of a single-layer film of any one of the above-listed materials, or may be each composed of a multilayer film including one of more of the above-listed materials. Materials employable herein are not limited to the above-listed ones. Any metal material having a relatively high resistance can be used for the sensors 51 and 52, and any metal material having a relatively low resistance can be used for the leads 61 and 62 and the connecting portions 53.

A group of a sensor 51, a connecting portion 53 and a sensor 52 connected in series will be hereinafter called a composite sensor 50. A group of a lead 61, a sensor 51 and a connecting portion 53, a sensor 52 and a lead 62 connected in series will be hereinafter called a sensor assembly 60. In the embodiment, each of a plurality of sensor assemblies 60 lies across a different one of the intra-row removal-intended portions 103 and a part of one of the inter-row removal-intended portions 102 adjacent thereto. The composite sensors 50 are to be energized through the leads 61 and 62.

Figure 8:
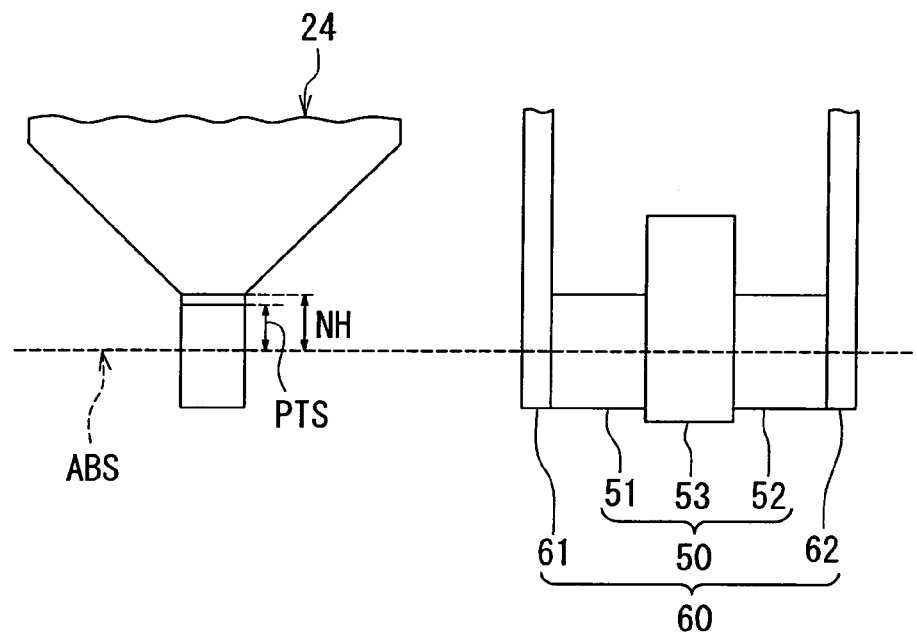
FIG. 8 is an explanatory view illustrating the positional relationship between the pole layer and first and second sensors in the magnetic head substructure according to the embodiment of the invention.
Figure 9:
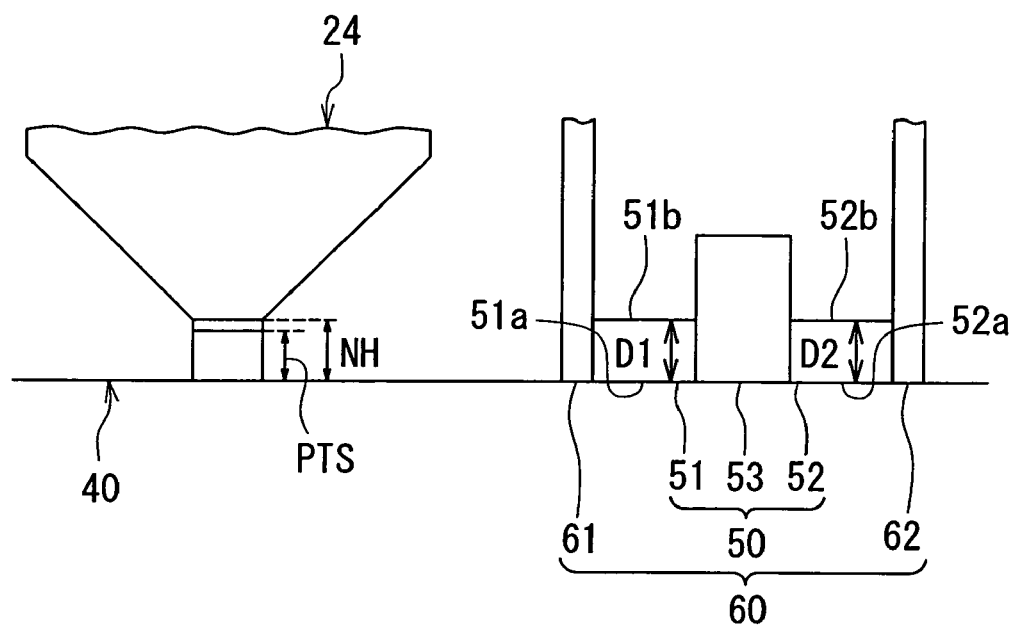
FIG. 9 is an explanatory view illustrating the positional relationship between the pole layer and the first and second sensors when the medium facing surface has been formed in a method of manufacturing the magnetic head according to the embodiment of the invention.

Reference is now made to FIG. 8 and FIG. 9 to describe the relationship between the pole layer 24 and the sensors 51 and 52. FIG. 8 is an explanatory view illustrating the positional relationship between the pole layer 24 and the sensors 51 and 52. FIG. 9 is an explanatory view illustrating the positional relationship between the pole layer 24 and the sensors 51 and 52 when the medium facing surface 40 has been formed.

As illustrated in FIG. 8, in the substructure 100, the sensor 51 and the sensor 52 are disposed to lie across an intra-row removal-intended portion 103 and a part of an inter-row removal-intended portion 102 that are adjacent to each other with the plane ABS located in between. The plane geometry of each of the sensors 51 and 52 is a rectangle having two sides parallel to the plane ABS and two sides perpendicular to the plane ABS.

As illustrated in FIG. 9, when the medium facing surface 40 has been formed, the sensor 51 has a first end 51a located in the medium facing surface 40 and a second end 51b opposite thereto, while the sensor 52 has a first end 52a located in the medium facing surface 40 and a second end 52b opposite thereto. Here, the distance between the first end 51a and the second end 51b is represented by the symbol "D1", and the distance between the first end 52a and the second end 52b is represented by the symbol "D2". The resistance value R1 of the sensor 51 has a correspondence with the distance D1, while the resistance value R2 of the sensor 52 has a correspondence with the distance D2. The resistance values R1 and R2 correspond to the individual sensor values of the present invention.

As will be described in detail later, the position of the sensor 51 is determined in the step of determining the position of a portion of the pole layer 24 that defines NH, that is, in the step of determining the position of the boundary between the track width defining portion 24A and the wide portion 24B. Therefore, the position of the second end 51b of the sensor 51 has a correspondence with NH. Consequently, when the medium facing surface 40 has been formed, the distance D1 and the resistance value R1 of the sensor 51 each have a correspondence with NH. Each of NH, the distance D1 and the resistance value R1 depends on the position of the medium facing surface 40. Therefore, the sensor 51 shows the resistance value R1 as the individual sensor value corresponding to the value of NH which is a parameter that has an influence on the characteristics of the magnetic head relating to the pole layer 24 and that depends on the position of the medium facing surface 40.

As will also be described in detail later, the position of the sensor 52 is determined in the step of determining the position of a portion of the pole layer 24 that defines PTS, that is, in the step of determining the position of the boundary between the first portion 24C and the second portion 24D. Therefore, the position of the second end 52b of the sensor 52 has a correspondence with PTS. Consequently, when the medium facing surface 40 has been formed, the distance D2 and the resistance value R2 of the sensor 52 each have a correspondence with PTS. Each of PTS, the distance D2 and the resistance value R2 depends on the position of the medium facing surface 40. Therefore, the sensor 52 shows the resistance value R2 as the individual sensor value corresponding to the value of PTS which is a parameter that has an influence on the characteristics of the magnetic head relating to the pole layer 24 and that depends on the position of the medium facing surface 40.

The resistance value R0 of the composite sensor 50 between the leads 61 and 62 depends on the resistance values R1 and R2. In the embodiment, the composite sensor 50 is formed by connecting the sensor 51 and the sensor 52 in series to each other via the connecting portion 53. The resistance value R0 of the composite sensor 50 is therefore nearly equal to R1+R2, although it may slightly vary depending on the resistance value of the connecting portion 53 or the manner in which the sensors 51 and 52 are connected to the connecting portion 53. The resistance value R0 of the composite sensor 50 is detectable by measuring the value of the current flowing between the leads 61 and 62 when a predetermined voltage is applied between the leads 61 and 62. The resistance value R0 of the composite sensor 50 corresponds to the composite sensor value of the present invention.

In the method of manufacturing the magnetic head according to the embodiment, the step of fabricating the substructure 100 includes the step of forming the sensor 51 and the step of forming the sensor 52. Furthermore, the step of fabricating the magnetic heads includes the step of forming the medium facing surfaces 40 by lapping a surface formed by cutting the substructure 100. In the step of forming the medium facing surfaces 40, lapping is performed so that the resistance value R0 of the composite sensor 50 becomes a predetermined value.

Focusing attention on one of the pre-head portions 101, the step of fabricating the substructure 100 will now be described in detail. Each of FIG. 10 to FIG. 18 is a cross-sectional view illustrating a stack of layers obtained in the course of fabricating the substructure 100. In FIG. 10 to FIG. 18 the portions from the substrate 1 to the separating layer 9 are omitted.

In the step of fabricating the substructure 100, first, the insulating layer 2 is formed on the substrate 1. Next, the first read shield layer 3 is formed on the insulating layer 2. Next, the MR element 5, the two bias magnetic field applying layers 6 and the insulating layer 7 are formed on the first read shield layer 3. Next, the second read shield layer 8 is formed on the MR element 5, the bias magnetic field applying layers 6 and the insulating layer 7. Next, the separating layer 9 is formed on the second read shield layer 8.

Figure 10:
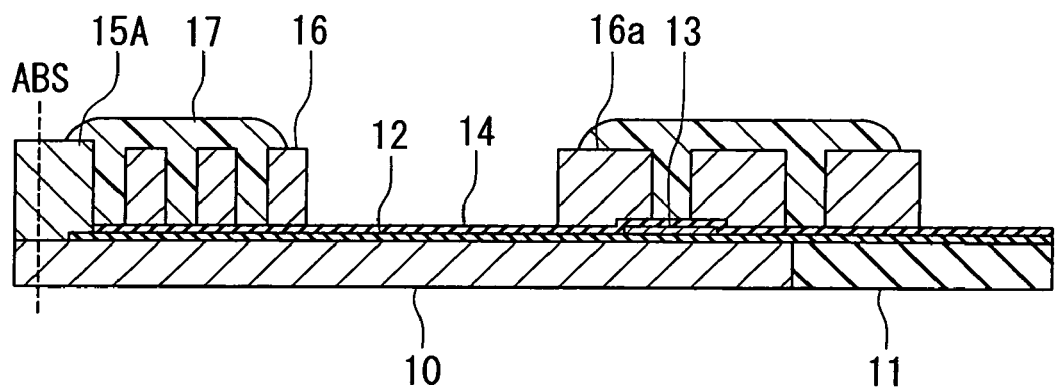
FIG. 10 is a cross-sectional view illustrating a step of the process of fabricating the magnetic head substructure according to the embodiment of the invention.

FIG. 10 illustrates the next step. In this step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the insulating film 12 is formed on the magnetic layer 10 and the insulating layer 11. Next, the heater 13, and the leads (not shown) are formed on the insulating film 12. Next, the insulating film 14 is formed on the insulating film 12, the heater 13 and the leads so as to cover the heater 13 and the leads.

Next, the first layer 15A of the first shield 15 is formed on the magnetic layer 10 by frame plating, for example. Next, the coil 16 is formed on the insulating film 14 by frame plating, for example. Next, the insulating layer 17 is formed so that the space between the coil 16 and the first layer 15A and the space between the respective adjacent turns of the coil 16 are filled with the insulating layer 17.

Figure 11:
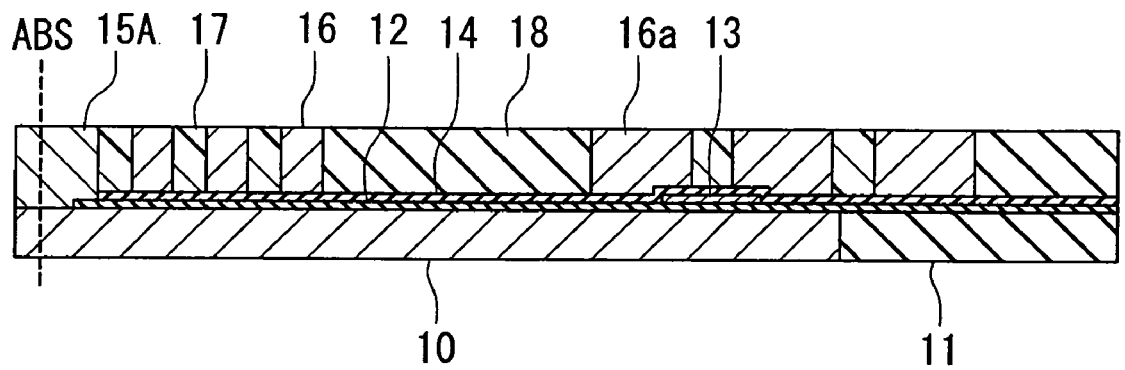
FIG. 11 is a cross-sectional view illustrating a step that follows the step of FIG. 10.

FIG. 11 illustrates the next step. In this step, first, the insulating layer 18 is formed on the entire top surface of the stack of layers of FIG. 10. Next, the insulating layer 18 is polished by CMP, for example, so that the first layer 15A and the coil 16 are exposed, and the top surfaces of the first layer 15A, the coil 16 and the insulating layer 18 are thereby flattened.

Figure 12:
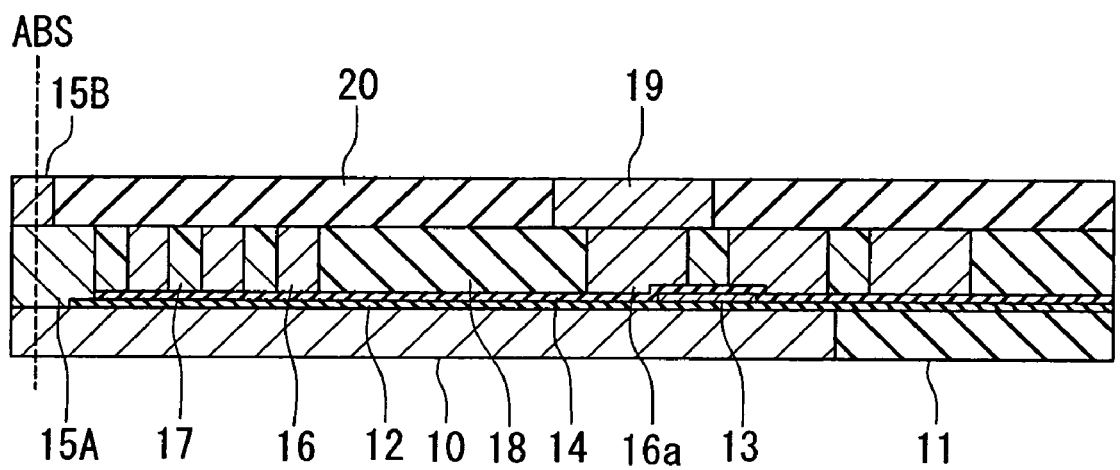
FIG. 12 is a cross-sectional view illustrating a step that follows the step of FIG. 11.

FIG. 12 illustrates the next step. In this step, first, the second layer 15B and the connecting layer 19 are formed by frame plating, for example. Next, the insulating layer 20 is formed on the entire top surface of the stack of layers. Next, the insulating layer 20 is polished by CMP, for example, so that the second layer 15B and the connecting layer 19 are exposed, and the top surfaces of the second layer 15B, the connecting layer 19 and the insulating layer 20 are thereby flattened.

Figure 13:
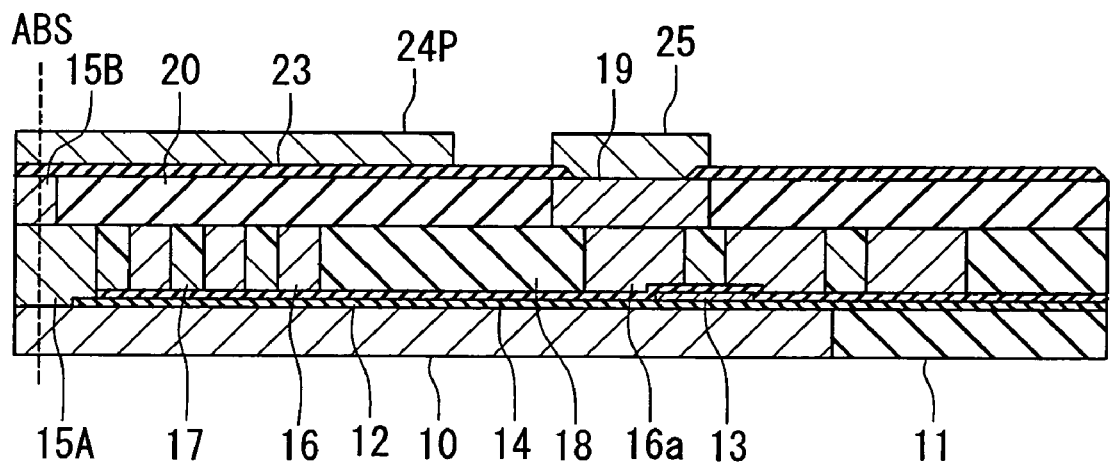
FIG. 13 is a cross-sectional view illustrating a step that follows the step of FIG. 12.

FIG. 13 illustrates the next step. In this step, first, the first gap layer 23 is formed on the entire top surface of the stack of layers of FIG. 12. Next, an opening is formed in the first gap layer 23 in the region corresponding to the top surface of the connecting layer 19. Next, a magnetic layer 24P and the connecting layer 25 are formed by frame plating, for example, the magnetic layer 24P being intended to become the pole layer 24 later.

Figure 14:
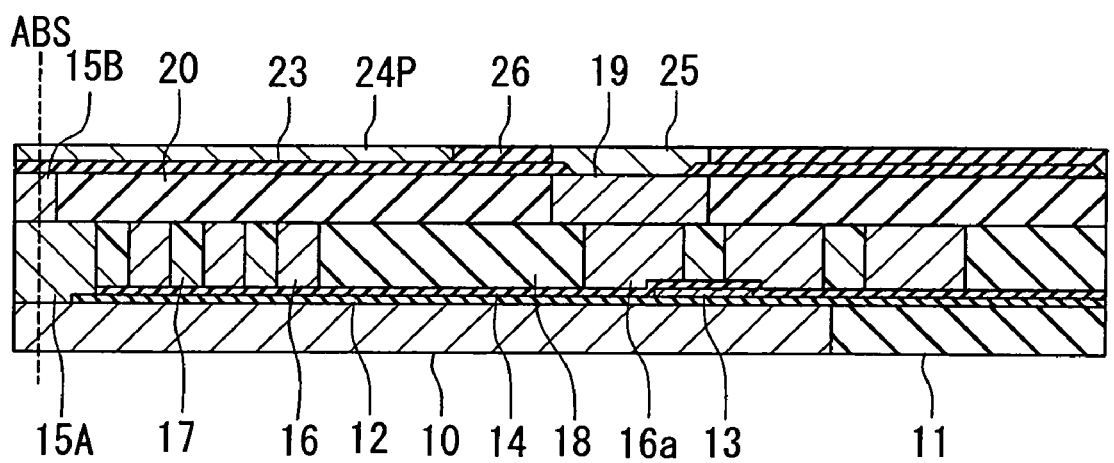
FIG. 14 is a cross-sectional view illustrating a step that follows the step of FIG. 13.

FIG. 14 illustrates the next step. In this step, first, the insulating layer 26 is formed on the entire top surface of the stack of layers of FIG. 13. Next, the insulating layer 26, the magnetic layer 24P and the connecting layer 25 are polished by CMP, for example, so that the magnetic layer 24P and the connecting layer 25 are exposed and these layers achieve desired thicknesses, and the top surfaces of the layers 26, 24P and 25 are thereby flattened.

Figure 15:
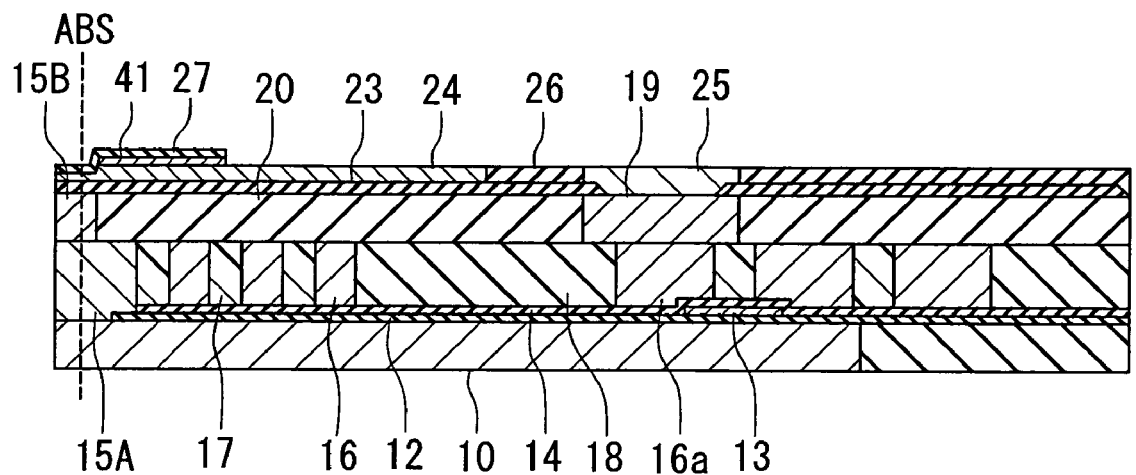
FIG. 15 is a cross-sectional view illustrating a step that follows the step of FIG. 14.

FIG. 15 illustrates the next step. In this step, first, the nonmagnetic layer 41 is formed on part of the top surface of the stack of layers of FIG. 14. Next, the magnetic layer 24P is partially etched using the nonmagnetic layer 41 as a mask, so that the first portion A1, the second portion A2 and the third portion A3 are formed in the top surface of the magnetic layer 24P and the magnetic layer 24P thereby becomes the pole layer 24. Next, the second gap layer 27 is formed on the pole layer 24 and the nonmagnetic layer 41. Next, the nonmagnetic layer 41 and the second gap layer 27 are selectively etched so that the top surface of the connecting layer 25 and part of the top surface of the pole layer 24 away from the medium facing surface 40 are exposed.

Figure 16:
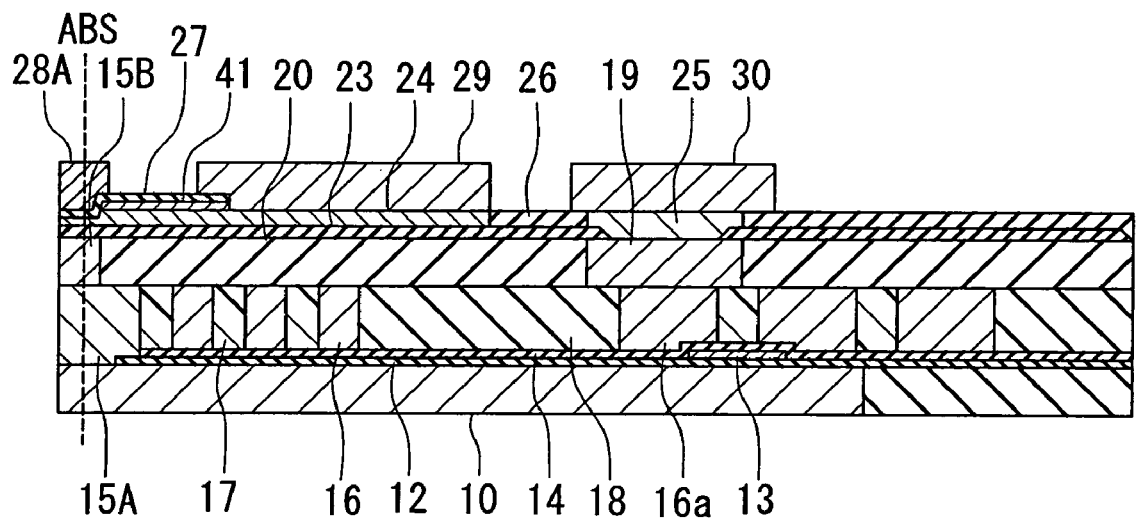
FIG. 16 is a cross-sectional view illustrating a step that follows the step of FIG. 15.

Next, as illustrated in FIG. 16, the first layer 28A of the second shield 28, the yoke layer 29, and the connecting layer 30 are formed by frame plating, for example.

Figure 17:
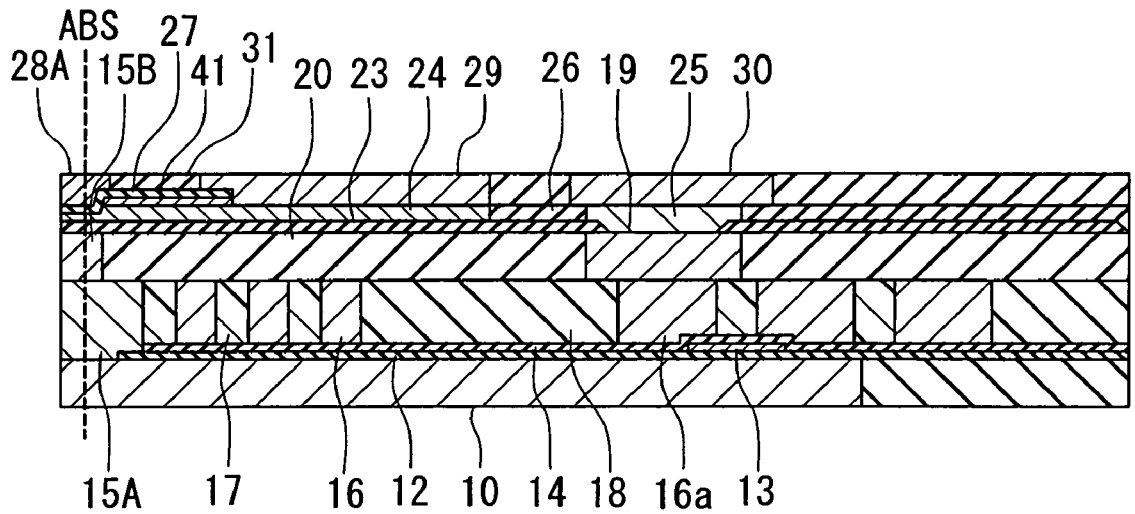
FIG. 17 is a cross-sectional view illustrating a step that follows the step of FIG. 16.

FIG. 17 illustrates the next step. In this step, first, the insulating layer 31 is formed on the entire top surface of the stack of layers of FIG. 16. Next, the insulating layer 31, the first layer 28A, the yoke layer 29 and the connecting layer 30 are polished by CMP, for example, so that the first layer 28A, the yoke layer 29 and the connecting layer 30 are exposed and these layers achieve desired thicknesses, and the top surfaces of the layers 31, 28A, 29 and 30 are thereby flattened.

Figure 18:
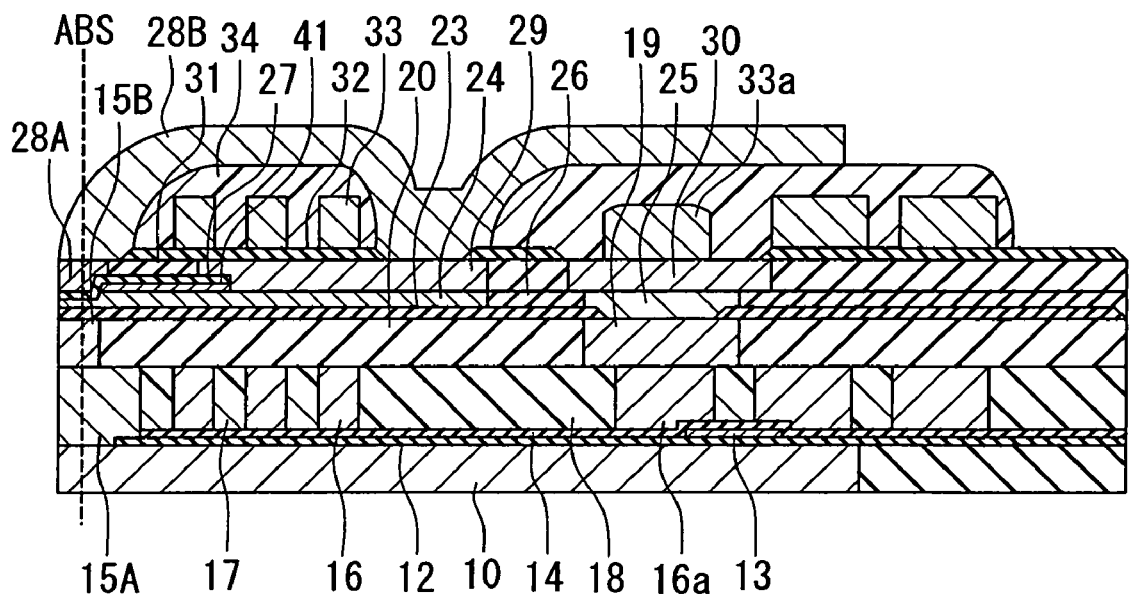
FIG. 18 is a cross-sectional view illustrating a step that follows the step of FIG. 17.

FIG. 18 illustrates the next step. In this step, first, the insulating layer 32 is formed on the yoke layer 29 and the insulating layer 31. The insulating layer 32 may be formed by partially etching an insulating film formed on the entire top surface of the stack of layers of FIG. 17 by ion milling, for example, or may be formed by lift-off.

Next, the coil 33 is formed. The connecting portion 33a of the coil 33 is disposed on the connecting layer 30, and the other portion of the coil 33 is disposed on the insulating layer 32. Next, the insulating layer 34 is formed to cover the coil 33. Next, the second layer 28B is formed by frame plating, for example.

Next, as illustrated in FIG. 4, the overcoat layer 35 is formed. Next, wiring and terminals and so on are formed on the overcoat layer 35. In the embodiment, two terminals connected to the MR element 5, two terminals connected to the coils 16 and 33, and two terminals connected to the heater 13 are formed on the overcoat layer 35 in each pre-head portion 101. Furthermore, in each intra-row removal-intended portion 103, two terminals connected to the leads 61 and 62 are formed on the overcoat layer 35. In such a manner, components of a plurality of magnetic heads are formed on a single substrate 1, whereby the substructure 100 is fabricated in which a plurality of pre-head portions 101 each of which will be the magnetic head later are aligned in a plurality of rows, as illustrated in FIG. 6 and FIG. 7.

An example of the process of forming the pole layer 24 and the sensor assembly 60 will now be described in detail with reference to FIG. 19 to FIG. 35. The configuration and formation method of the sensor assembly 60 are not limited to the following example, however.

Figure 19:
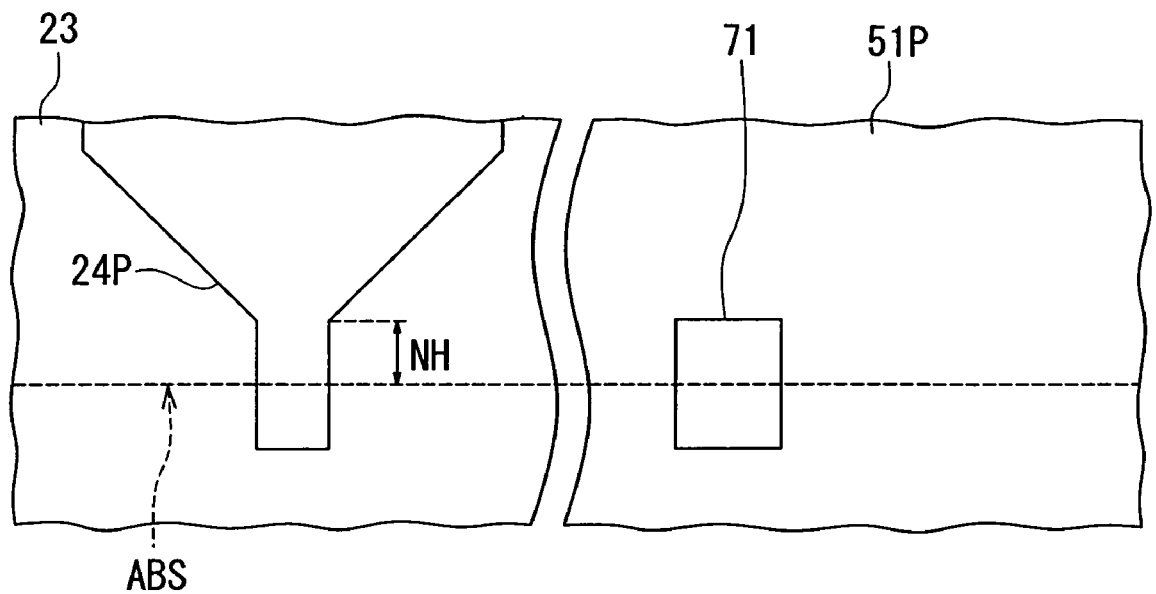
FIG. 19 is a top view of a stack of layers obtained through a step of the process of forming the pole layer and a sensor assembly of the embodiment of the invention.
Figure 20:
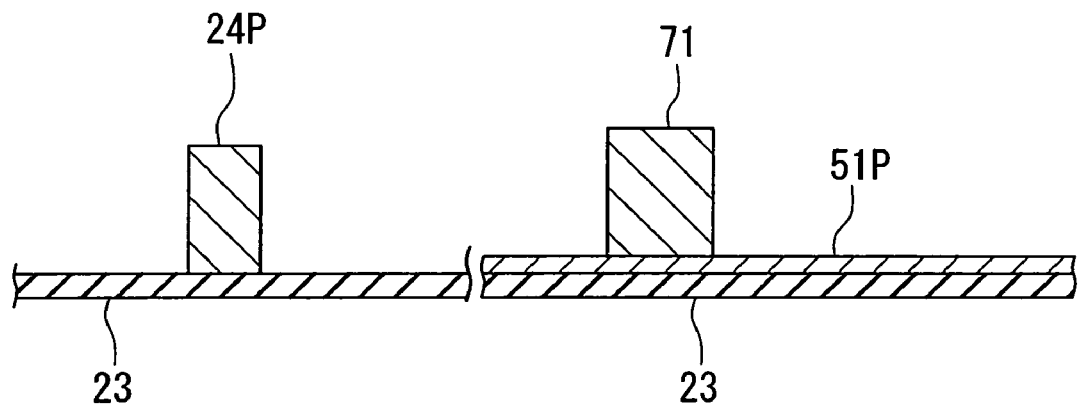
FIG. 20 is a cross-sectional view of the stack of layers of FIG. 19.

FIG. 19 is a top view of a stack of layers obtained through a step of the process of forming the pole layer 24 and the sensor assembly 60. FIG. 20 is a cross-sectional view of the stack of layers of FIG. 19 taken at the plane ABS. FIG. 19 and FIG. 20 illustrate the stack of layers having undergone the step of FIG. 13, that is, at the point when the magnetic layer 24P has been formed. In the embodiment, before forming the magnetic layer 24P, a conductor layer 51P is formed on the insulating layer 23 by sputtering, for example, in the inter-row removal-intended portion 102 and the intra-row removal-intended portion 103. The conductor layer 51P is to be partially etched later to thereby become the first sensor 51.

In the embodiment, when the magnetic layer 24P is formed by frame plating, an etching mask 71 is formed at the same time on the conductor layer 51P by frame plating. The etching mask 71 has a plane geometry corresponding to the plane geometry of the first sensor 51 to be formed later. The etching mask 71 is formed of the same material as the magnetic layer 24P. The frame to be used for forming the magnetic layer 24P and the etching mask 71 by frame plating is formed by patterning a photoresist layer by photolithography.

In the embodiment, the position of the portion of the pole layer 24 that defines NH, that is, the position of the boundary between the track width defining portion 24A and the wide portion 24B, is determined in the step of forming the magnetic layer 24P. Therefore, the step of forming the magnetic layer 24P is the step of determining the position of the portion of the magnetic head relating to the value of NH.

Figure 21:
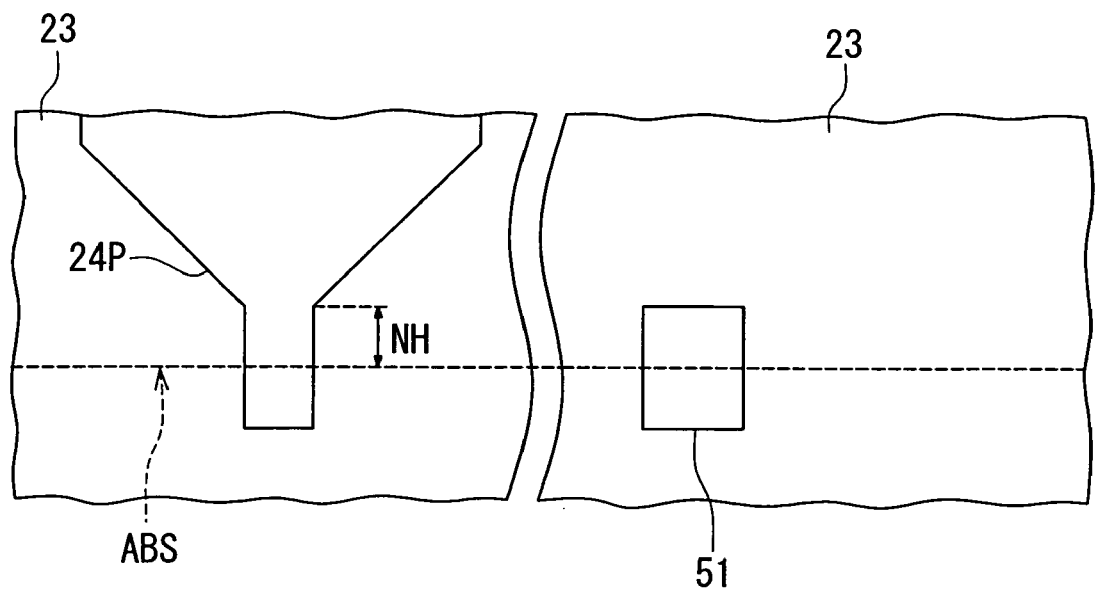
FIG. 21 is a top view of a stack of layers obtained through a step that follows the step of FIG. 19.
Figure 22:
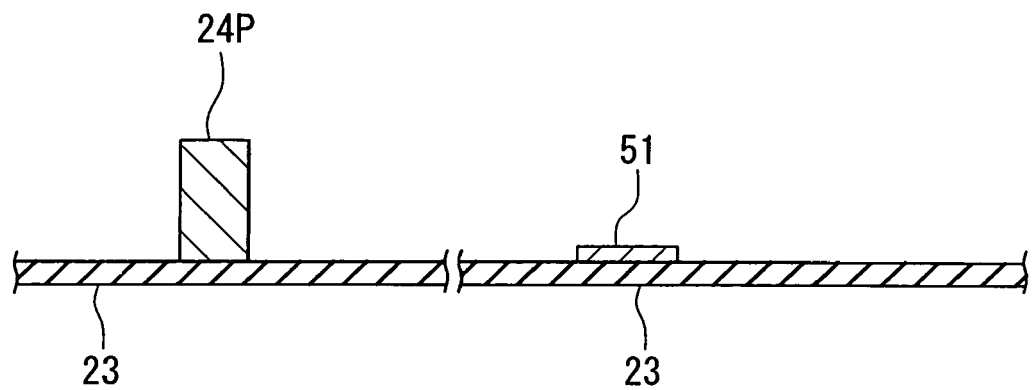
FIG. 22 is a cross-sectional view of the stack of layers of FIG. 21.

FIG. 21 and FIG. 22 illustrate the next step. FIG. 21 is a top view of a stack of layers obtained through a step that follows the step of FIG. 19. FIG. 22 is a cross-sectional view of the stack of layers of FIG. 21 taken at the plane ABS. In this step, the portion of the conductor layer 51P not covered with the etching mask 71 is selectively etched by dry etching. Next, the etching mask 71 is removed by wet etching. The remaining portion of the conductor layer 51P becomes the first sensor 51.

In the embodiment, the position of the first sensor 51 is determined by the etching mask 71 that is formed simultaneously with the magnetic layer 24P. Therefore, the position of the first sensor 51 is determined in the step of determining the position of the portion relating to the value of NH that is a parameter corresponding to the first sensor 51, that is, in the step of forming the magnetic layer 24P. Furthermore, the position of the first sensor 51 is associated with the position of the portion relating to the value of NH.

Figure 23:
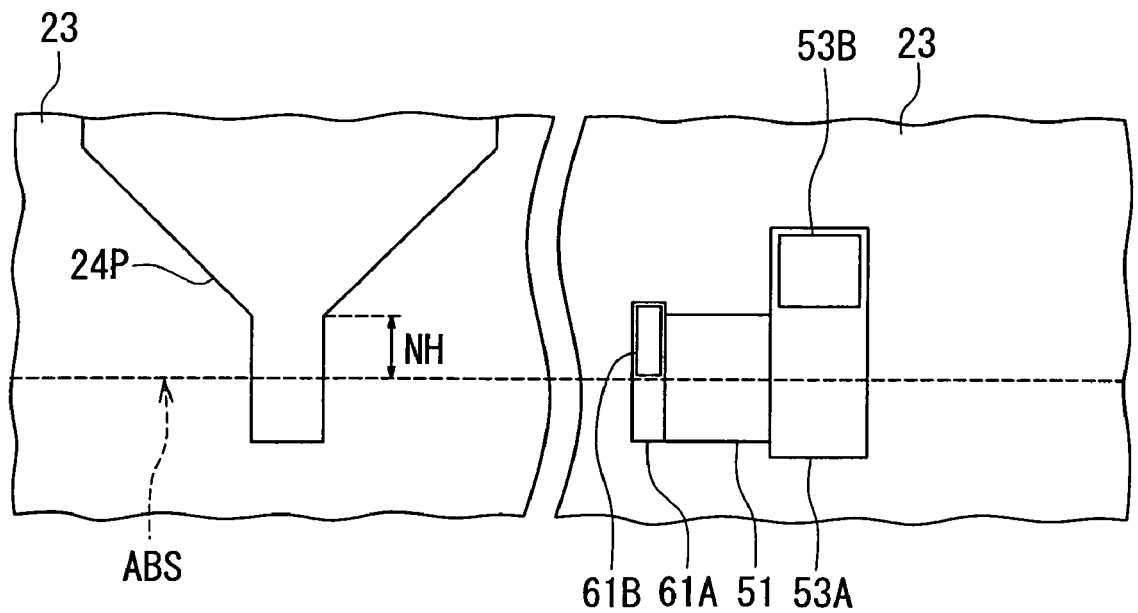
FIG. 23 is a top view of a stack of layers obtained through a step that follows the step of FIG. 21.
Figure 24:
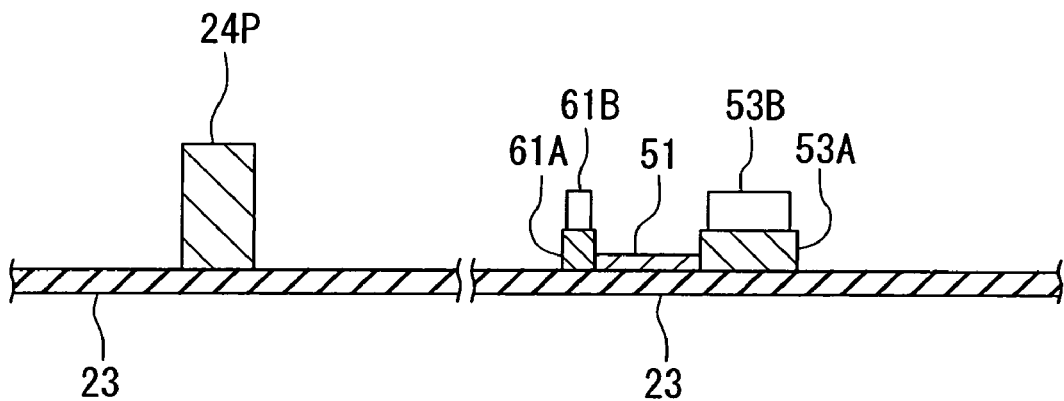
FIG. 24 is a cross-sectional view of the stack of layers of FIG. 23.

FIG. 23 and FIG. 24 illustrate the next step. FIG. 23 is a top view of a stack of layers obtained through a step that follows the step of FIG. 21. FIG. 24 is a cross-sectional view of the stack of layers of FIG. 23 taken at the plane ABS. In this step, first, conductor layers 53A and 61A are formed on both sides of the first sensor 51, respectively, by frame plating or lift-off, for example. Each of the conductor layers 53A and 61A touches the first sensor 51. Next, a conductor layer 53B is formed on the conductor layer 53A, and a conductor layer 61B is formed on the conductor layer 61A, by frame plating or lift-off, for example. The conductor layers 53A and 53B constitute a portion of the connecting layer 53. The conductor layers 61A and 61B constitute a portion of the lead 61.

Figure 25:
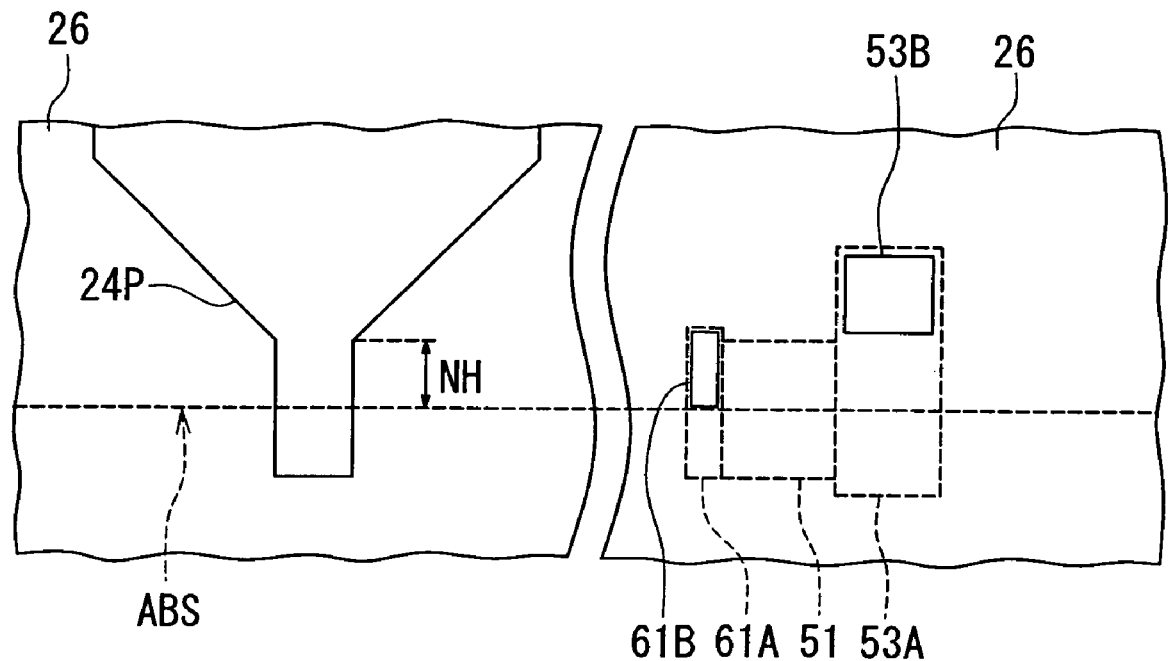
FIG. 25 is a top view of a stack of layers obtained through a step that follows the step of FIG. 23.
Figure 26:
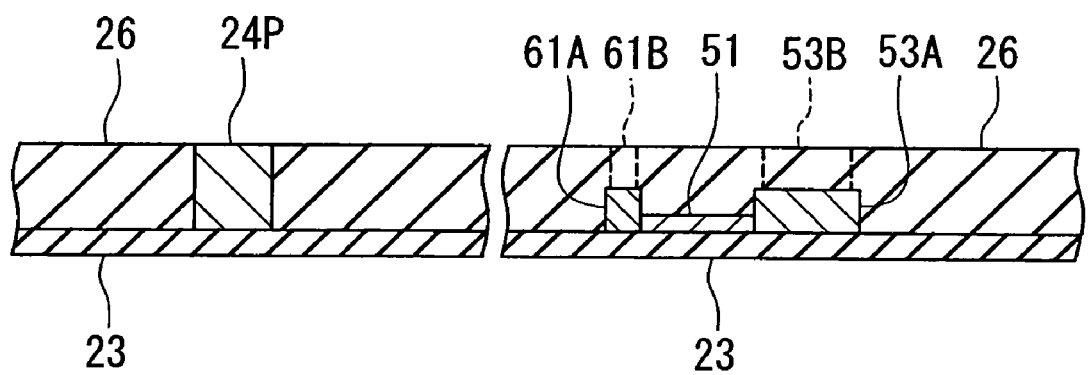
FIG. 26 is a cross-sectional view of the stack of layers of FIG. 25.

FIG. 25 and FIG. 26 illustrate the next step. FIG. 25 is a top view of a stack of layers obtained through a step that follows the step of FIG. 23. FIG. 26 is a cross-sectional view of the stack of layers of FIG. 25 taken at the plane ABS. This step is the same as the step of FIG. 14. In this step, first, the insulating layer 26 is formed on the entire top surface of the stack of layers shown in FIG. 23 and FIG. 24. Next, the insulating layer 26, the magnetic layer 24P, the connecting layer 25 and the conductor layers 53B and 61B are polished by CMP, for example, so that the magnetic layer 24P, the connecting layer 25 (see FIG. 14) and the conductor layers 53B and 61B are exposed and these layers attain desired thicknesses, and the top surfaces of the layers 26, 24P, 25, 53B and 61B are thereby flattened.

Figure 27:
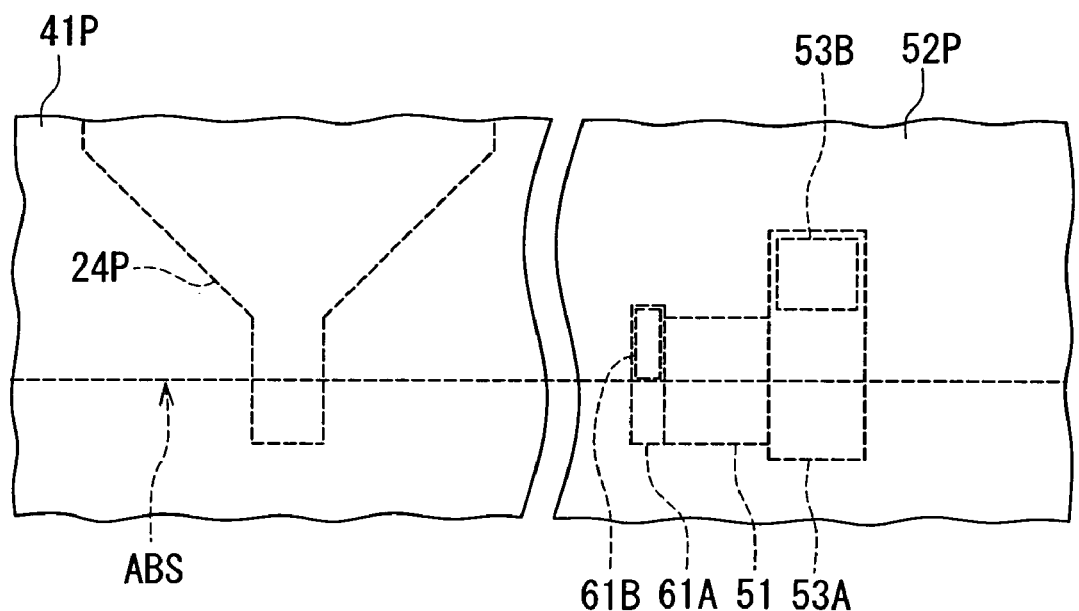
FIG. 27 is a top view of a stack of layers obtained through a step that follows the step of FIG. 25.
Figure 28:
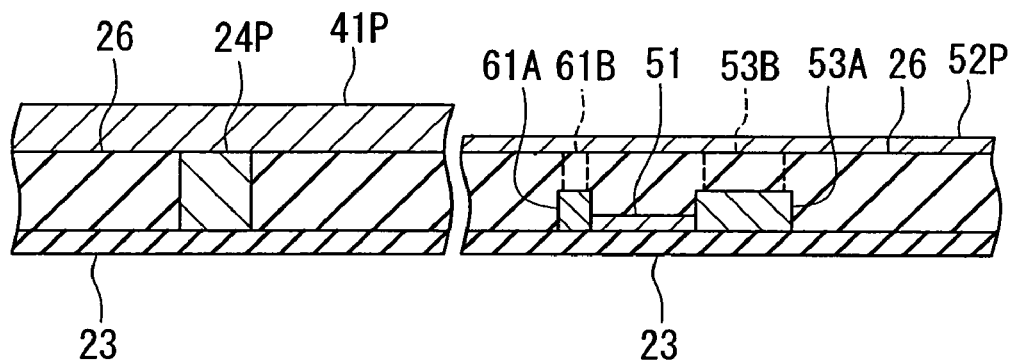
FIG. 28 is a cross-sectional view of the stack of layers of FIG. 27.

FIG. 27 and FIG. 28 illustrate the next step. FIG. 27 is a top view of a stack of layers obtained through a step that follows the step of FIG. 25. FIG. 28 is a cross-sectional view of the stack of layers of FIG. 27 taken at the plane ABS. In this step, a nonmagnetic film 41P is formed on the magnetic layer 24P by sputtering, for example. The nonmagnetic film 41P is to be partially etched later to thereby become the nonmagnetic layer 41. Furthermore, a conductor layer 52P is formed on the conductor layers 53B and 61B and the insulating layer 26 by sputtering, for example, in the inter-row removal-intended portion 102 and the intra-row removal-intended portion 103. The conductor layer 52P is to be partially etched later to thereby become the second sensor 52.

Figure 29:
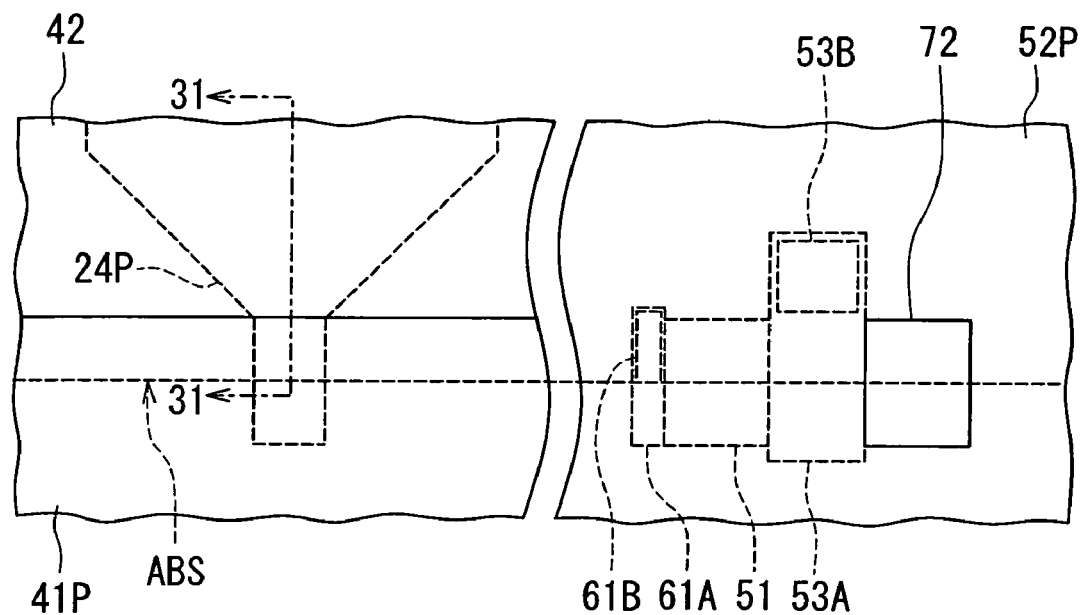
FIG. 29 is a top view of a stack of layers obtained through a step that follows the step of FIG. 27.
Figure 30:
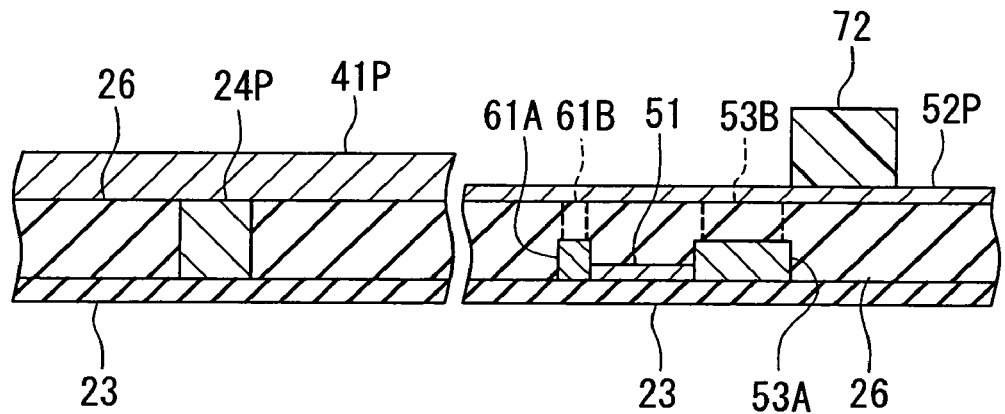
FIG. 30 is a cross-sectional view of the stack of layers of FIG. 29.
Figure 31:
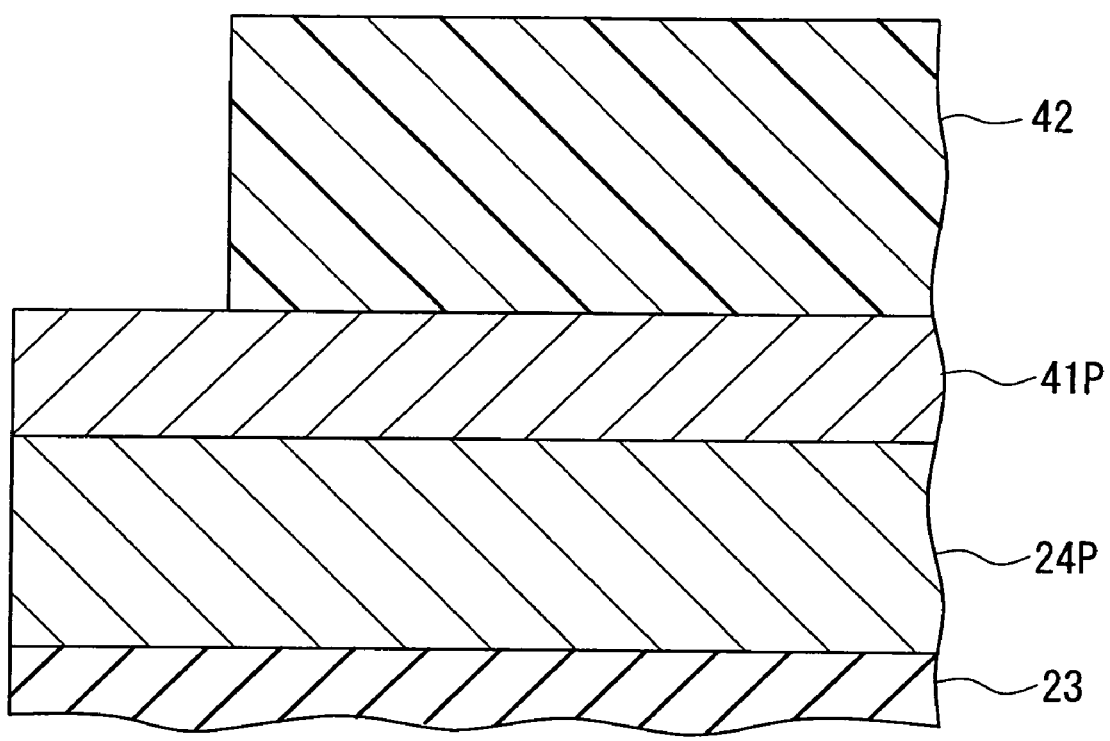
FIG. 31 is an enlarged cross-sectional view taken along line 31-31 of FIG. 29.

FIG. 29 to FIG. 31 illustrate the next step. FIG. 29 is a top view of a stack of layers obtained through a step that follows the step of FIG. 27. FIG. 30 is a cross-sectional view of the stack of layers of FIG. 29 taken at the plane ABS. FIG. 31 is an enlarged cross-sectional view taken along line 31-31 of FIG. 29. In this step, an etching mask 42 is formed on the nonmagnetic film 41P. The etching mask 42 covers the portion of the nonmagnetic film 41P to become the nonmagnetic layer 41. Furthermore, an etching mask 72 is formed on the conductor layer 52P in the inter-row removal-intended portion 102 and the intra-row removal-intended portion 103. The etching mask 72 has a plane geometry corresponding to the plane geometry of the second sensor 52 to be formed later. The etching masks 42 and 72 are formed at the same time by patterning a photoresist layer by photolithography, for example.

Figure 32:
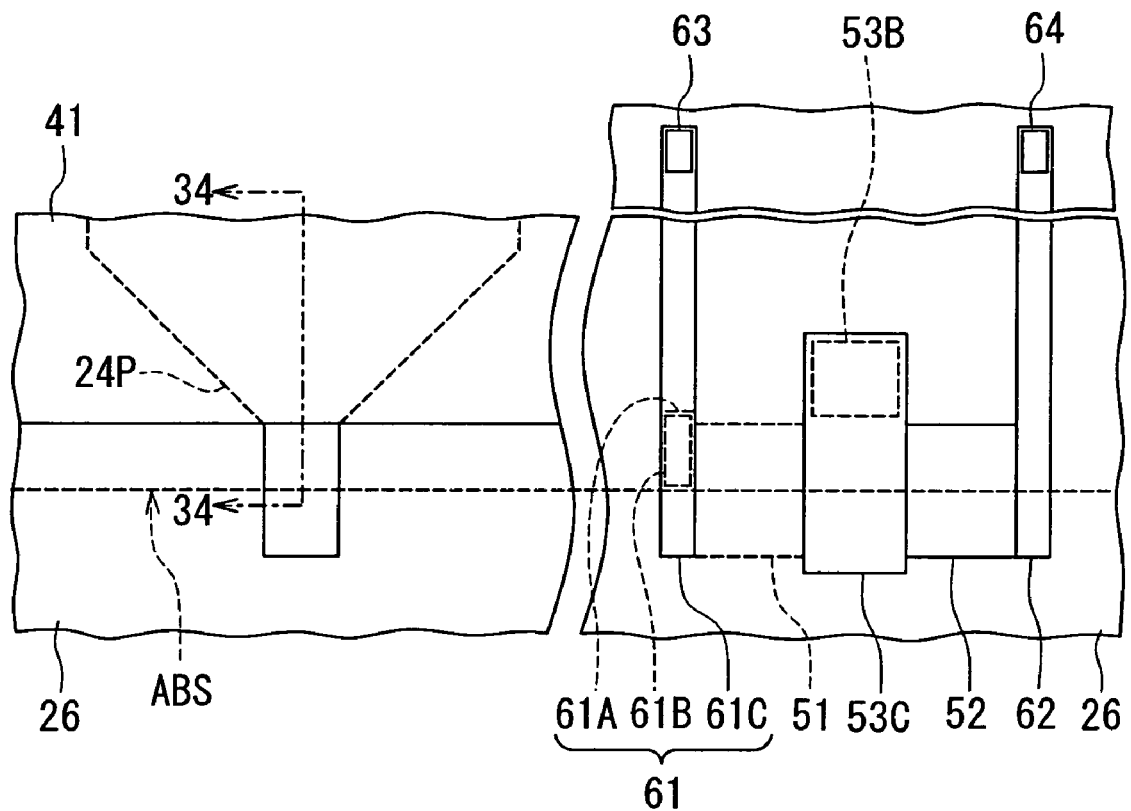
FIG. 32 is a top view of a stack of layers obtained through a step that follows the step of FIG. 29.
Figure 33:
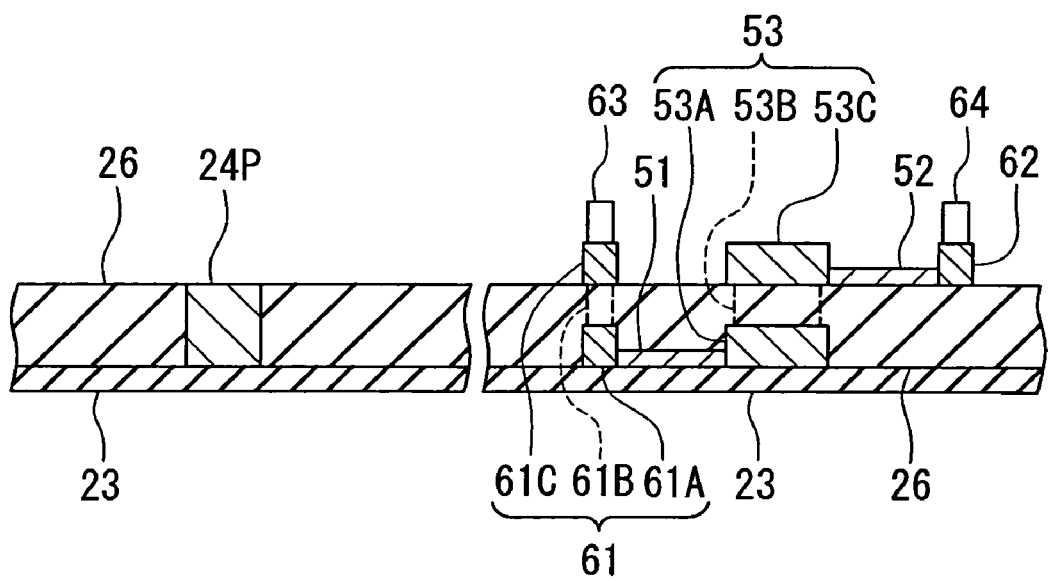
FIG. 33 is a cross-sectional view of the stack of layers of FIG. 32.
Figure 34:
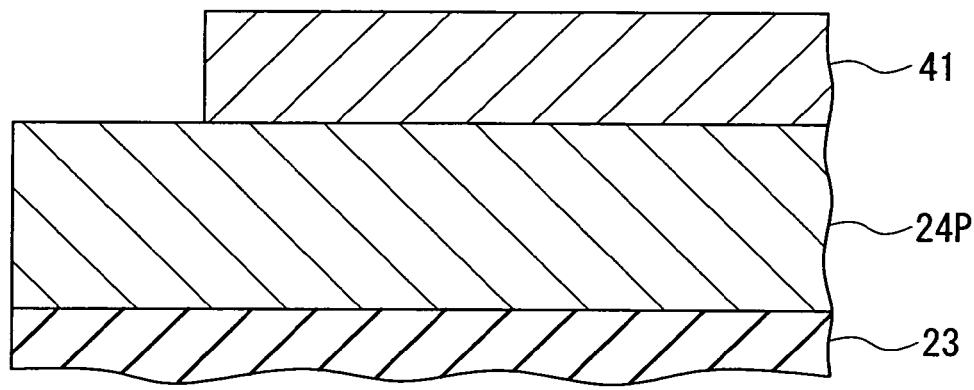
FIG. 34 is an enlarged cross-sectional view taken along line 34-34 of FIG. 32.

FIG. 32 to FIG. 34 illustrate the next step. FIG. 32 is a top view of a stack of layers obtained through a step that follows the step of FIG. 29. FIG. 33 is a cross-sectional view of the stack of layers of FIG. 32 taken at the plane ABS. FIG. 34 is an enlarged cross-sectional view taken along line 34-34 of FIG. 32. In this step, the portion of the nonmagnetic film 41P not covered with the etching mask 42 and the portion of the conductor layer 52P not covered with the etching mask 72 are selectively etched by dry etching. As a result, the remaining portion of the nonmagnetic film 41P becomes the nonmagnetic layer 41, and the remaining portion of the conductor layer 52P becomes the second sensor 52. If the etching masks 42' and 72 remain after this etching, they are removed.

Next, by frame plating or lift-off, for example, a conductor layer 53C and the lead 62 are respectively formed on opposite sides of the second sensor 52, and a conductor layer 61C is formed on the conductor layer 61B. Each of the conductor layer 53C and the lead 62 touches the second sensor 52. The conductor layer 53C also touches the conductor layer 53B. The connecting portion 53 is composed of the conductor layers 53A, 53B and 53C. The lead 61 is composed of the conductor layers 61A, 61B and 61C. It suffices that the conductor layer 61C is connected to the conductor layer 61A via the conductor layer 61B, and the conductor layer 61C may be located only within the intra-row removal-intended portion 103. For convenience, conductor layers 63 and 64 to be formed later are shown in FIG. 32 and FIG. 33. The conductor layer 63 is disposed on the conductor layer 61C, while the conductor layer 64 is disposed on the lead 62. The conductor layer 63 is used for connecting the lead 61 to a terminal formed on the overcoat layer 35. The conductor layer 64 is used for connecting the lead 62 to another terminal formed on the overcoat layer 35.

Figure 35:
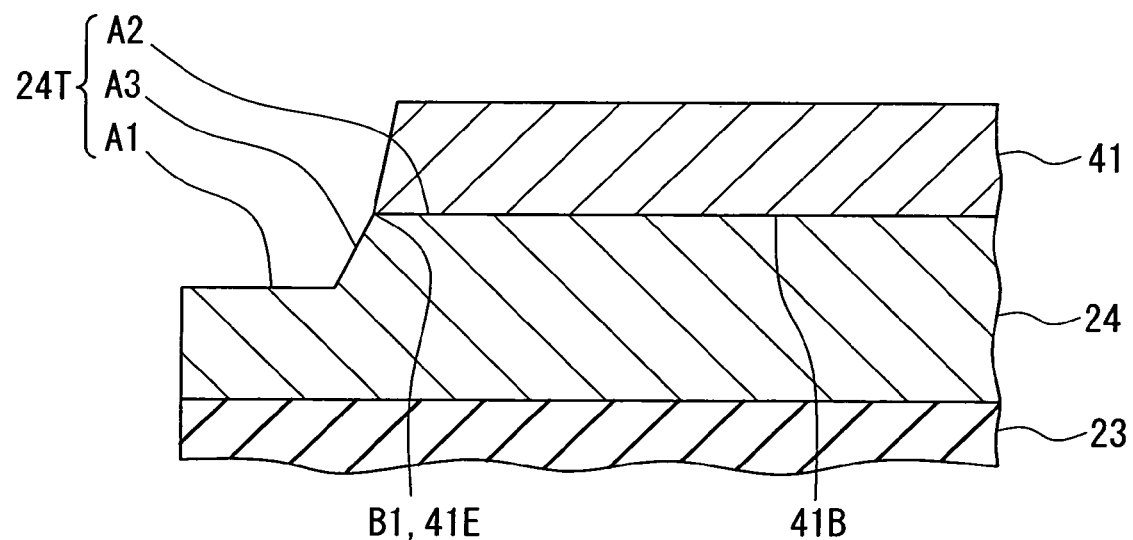
FIG. 35 is a cross-sectional view illustrating a step that follows the step of FIG. 34.

FIG. 35 illustrates the next step. FIG. 35 is a cross-sectional view illustrating a step that follows the step of FIG. 34. In this step, the magnetic layer 24P is partially etched by dry etching using the nonmagnetic layer 41 as a mask. As a result, the first portion A1, the second portion A2 and the third portion A3 are formed in the top surface of the magnetic layer 24P, and the magnetic layer 24P thereby becomes the pole layer 24. By partially etching the magnetic layer 24P using the nonmagnetic layer 41 as a mask as described above, the surface 41B of the nonmagnetic layer 41 touching the second portion A2 is provided with the edge 41E located at the boundary B1 between the second portion A2 and the third portion A3. In the embodiment, the nonmagnetic layer 41 is allowed to remain after this etching. Therefore, as the material to form the nonmagnetic layer 41, such a material is selected that its etching rate is lower than that of the magnetic layer 24P when the magnetic layer 24P is partially etched.

In the embodiment, the position of the portion of the pole layer 24 that defines PTS, that is, the position of the boundary between the first portion 24C and the second portion 24D, is determined by the position of the nonmagnetic layer 41. Therefore, the step of forming the nonmagnetic layer 41 is the step of determining the position of the portion of the magnetic head relating to the value of PTS.

In the embodiment, the second sensor 52 is formed simultaneously with the nonmagnetic layer 41. Therefore, the position of the second sensor 52 is determined in the step of determining the position of the portion relating to the value of PTS that is a parameter corresponding to the second sensor 52, that is, in the step of forming the nonmagnetic layer 41. Furthermore, the position of the second sensor 52 is associated with the position of the portion relating to the value of PTS.

The pole layer 24 and the sensor assembly 60 are formed through the series of steps described with reference to FIG. 19 to FIG. 35. Then, as illustrated in FIG. 15, the second gap layer 27 is formed on the pole layer 24 and the nonmagnetic layer 41. The steps described with reference to FIG. 15 to FIG. 18 are further performed, whereby the substructure 100 is fabricated.

Figure 36:
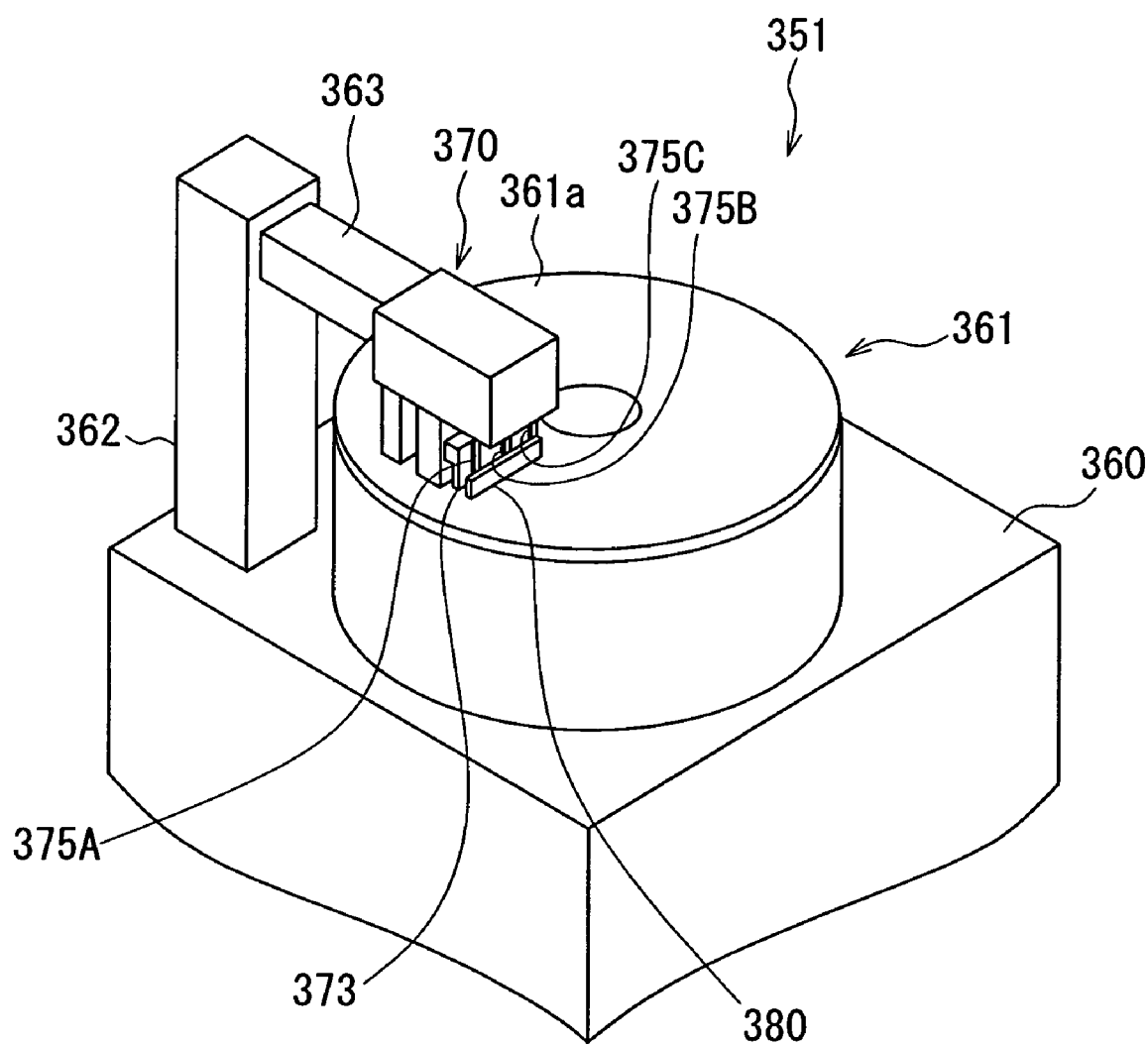
FIG. 36 is a perspective view illustrating an example of the configuration of a lapping apparatus used for lapping a head aggregate of the embodiment of the invention.
Figure 37:
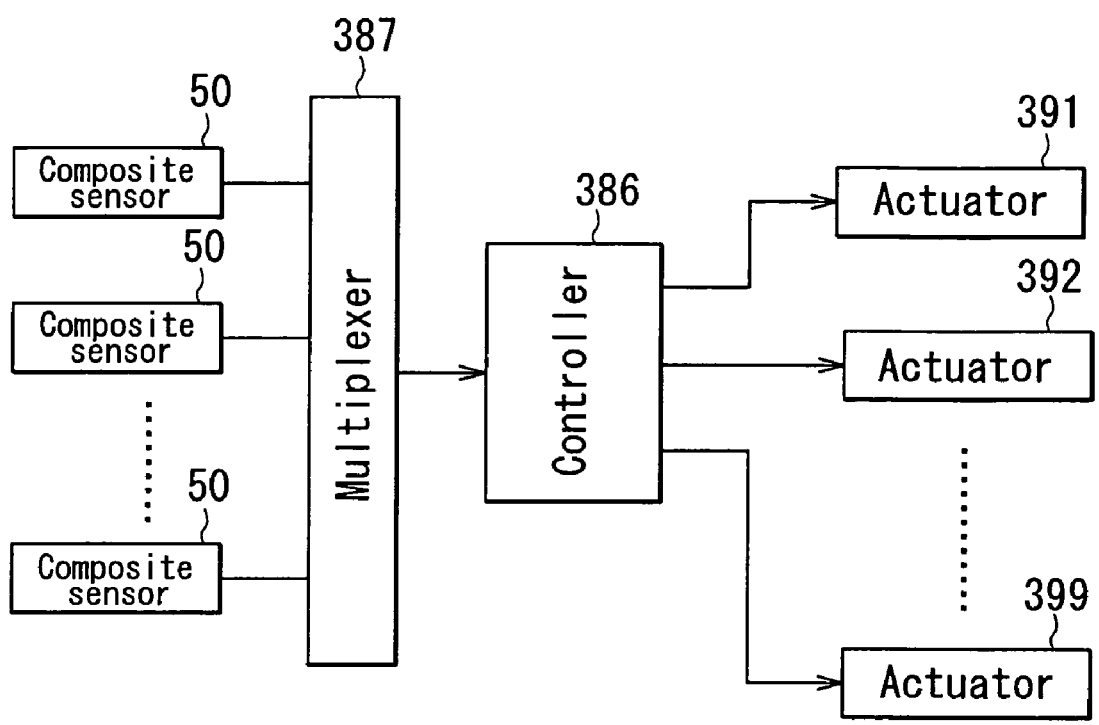
FIG. 37 is a block diagram illustrating an example of circuit configuration of the lapping apparatus of FIG. 36.

Reference is now made to FIG. 36 and FIG. 37 to describe the step of fabricating the magnetic heads in detail. In this step, first, the substructure 100 is cut at positions within the inter-row removal-intended portions 102 of FIG. 7 to thereby fabricate a plurality of head aggregates each of which includes a plurality of pre-head portions 101 aligned in a row.

Next, a surface (the surface closer to the plane ABS) formed in each head aggregate by cutting the substructure 100 is lapped to thereby form the medium facing surfaces 40 for the respective pre-head portions 101 included in the head aggregate. In this step of forming the medium facing surfaces 40, lapping is performed so that the resistance value R0, which is the composite sensor value, of each composite sensor 50 becomes a predetermined value.

FIG. 36 is a perspective view illustrating an example of configuration of a lapping apparatus for lapping each head aggregate. This lapping apparatus 351 includes: a table 360; a rotating lapping table 361 provided on the table 360; a strut 362 provided on the table 360 on a side of the rotating lapping table 361; and a supporter 370 attached to the strut 362 via an arm 363. The rotating lapping table 361 has a lapping plate (surface plate) 361a to come to contact with the surface to be the medium facing surfaces 40 of the pre-head portions 101 included in the head aggregate.

The supporter 370 includes a jig retainer 373, and three load application rods 375A, 375B and 375C placed in front of the jig retainer 373 at equal spacings. A jig 380 is to be fixed to the jig retainer 373. The jig 380 has three load application sections each of which is made up of a hole having an oblong cross section. At the lower ends of the load application rods 375A, 375B and 375C, there are respectively provided load application pins having respective heads, each oblong in cross section, to be inserted to the load application sections (holes) of the jig 380. Each of the load application pins is driven by an actuator (not shown) in the vertical, horizontal (along the length of the jig 380) and rotational directions.

The jig 380 has a retainer for retaining the head aggregate. With this jig 380, the retainer and the head aggregate are deformed by application of loads in various directions to the three load application sections. It is thereby possible to lap the surface to become the medium facing surfaces 40 of the pre-head portions 101 included in the head aggregate so that the resistance values R0 of a plurality of composite sensors 50 included in the head aggregate each become a predetermined value.

FIG. 37 is a block diagram illustrating an example of circuit configuration of the lapping apparatus of FIG. 36. This lapping apparatus includes: nine actuators 391 to 399 for applying loads in the three directions to the load application sections of the jig 380; a controller 386 for controlling the actuators 391 to 399 through monitoring the resistance values R0 of the plurality of composite sensors 50 in the head aggregate; and a multiplexer 387, connected to the plurality of composite sensors 50 in the head aggregate through a connector (not shown), for selectively connecting one of the composite sensors 50 to the controller 386.

In this lapping apparatus, the controller 386 monitors through the multiplexer 387 the resistance values R0 of the plurality of composite sensors 50 in the head aggregate, and controls the actuators 391 to 399 so that each of the resistance values R0 of the plurality of composite sensors 50 in the head aggregate is equal to a target value or falls within tolerance of the target value.

Flying rails are formed by etching, for example, in the medium facing surfaces 40 formed by lapping as described above. Each head aggregate is then cut at the positions of the intra-row removal-intended portions 103 of FIG. 7 to separate the plurality of pre-head portions 101 from one another, whereby a plurality of magnetic heads are formed.

The specific details of the step of fabricating the magnetic heads are not limited to the above-described example. For example, the magnetic heads may be fabricated in the following manner. First, the substructure 101 is cut to fabricate a first head aggregate including a plurality of pre-head portions 101 aligned in a plurality of rows. Next, a surface of the first head aggregate is lapped to form the medium facing surfaces 40 for one of the rows of the pre-head portions 101. Next, the first head aggregate is cut so that the one of the rows of the pre-head portions 101 whose medium facing surfaces 40 have been formed is separated to be a second head aggregate. Next, the second head aggregate is cut so that the pre-head portions 101 are separated from one another, whereby a plurality of magnetic heads are formed.

Figure 38:
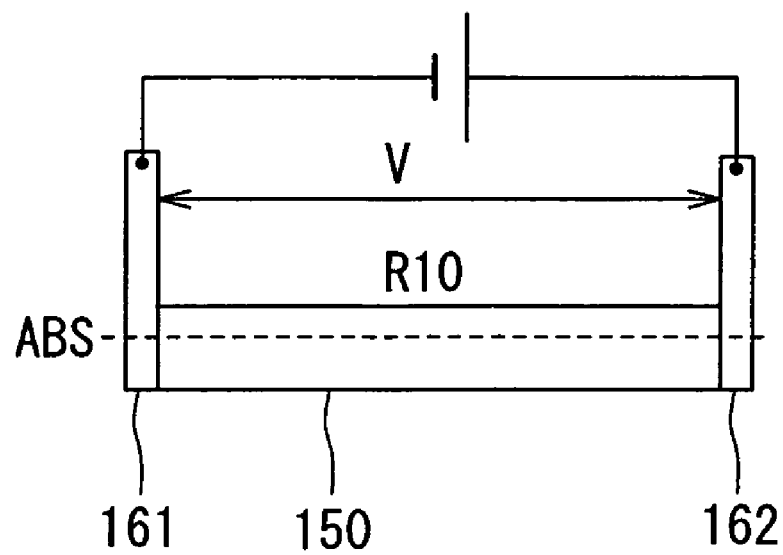
FIG. 38 is an explanatory view illustrating a sensor in a substructure of a comparative example.

Technical merits of the method of manufacturing the magnetic head and the substructure 100 according to the embodiment will now be described with reference to the results of a first and a second experiment. In the first experiment, a plurality of magnetic heads were fabricated using the substructure 100 according to the embodiment, and also a plurality of magnetic heads were fabricated using a substructure of a comparative example. The substructure of the comparative example includes a sensor 150 and leads 161 and 162 shown in FIG. 38, in place of the sensor assembly 60 of the embodiment. The sensor 150 is a resistor film having a rectangular plane geometry, and disposed to lie across an intra-row removal-intended portion 103 and a part of an inter-row removal-intended portion 102 adjacent thereto. The leads 161 and 162 are connected to opposite ends of the sensor 150, respectively. The sensor 150 shows a resistance value R10 corresponding to the value of NH. The resistance value R10 of the sensor 150 is detectable by measuring the value of the current flowing between the leads 161 and 162 when a predetermined voltage V is applied between the leads 161 and 162.

Figure 39:
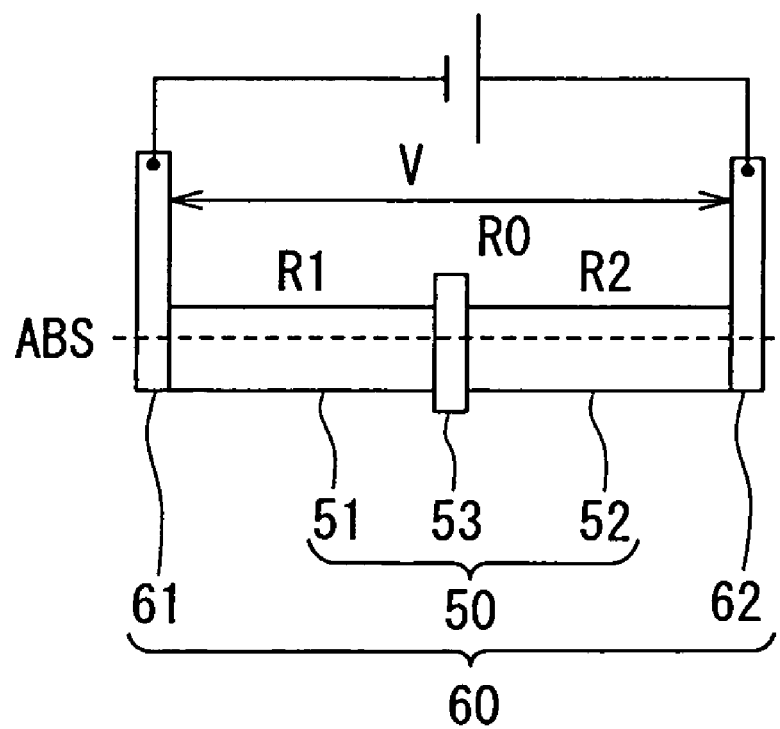
FIG. 39 is an explanatory view illustrating a sensor assembly used in a first experiment.

FIG. 39 illustrates the sensor assembly 60 of the embodiment. As previously described, the sensor assembly 60 includes the sensors 51 and 52, the connecting portion 53 and the leads 61 and 62. The composite sensor 50 is composed of the sensors 51 and 52 and the connecting portion 53. The sensor 51 shows the resistance value R1 as the individual sensor value corresponding to the value of NH. The sensor 52 shows the resistance value R2 as the individual sensor value corresponding to the value of PTS. The resistance value R0 of the composite sensor 50 depends on the resistance values R1 and R2. The resistance value R0 of the composite sensor 50 is detectable by measuring the value of the current flowing between the leads 61 and 62 when the predetermined voltage V is applied between the leads 61 and 62.

In the embodiment, the position of the portion of the pole layer 24 that defines NH and the position of the portion of the pole layer 24 that defines PTS are determined in different steps. Consequently, there arise variations in the positional relationship between the portion defining NH and the portion defining PTS, and there also arise variations in positional relationship between the sensor 51 and the sensor 52. FIG. 39 illustrates a case where the portion defining NH, the portion defining PTS, the sensor 51 and the sensor 52 are all in position as designed.

Each of NH and PTS is a parameter that has an influence on the characteristics of the magnetic head relating to the pole layer 24 and that depends on the position of the medium facing surface 40. Specifically, as NH or PTS decreases, the overwrite property improves while the effective track width increases. If NH or PTS is too small, the effective track width becomes too great, and consequently, the occurrence of a problem such as adjacent track erasing or unwanted writing between two adjacent tracks becomes noticeable and the yield of the magnetic head is thereby reduced. On the other hand, if NH or PTS is too great, the overwrite property suffers degradation and the yield of magnetic head is thereby reduced. To improve yields of magnetic heads, it is therefore required that the values of NH and PTS fall within their respective desirable ranges.

In the first and second experiments, yields of magnetic heads were defined as follows. First, of a plurality of magnetic heads fabricated out of a single substructure, the percentage of those satisfying the requirement that the overwrite property be −25 dB or lower was defined as OW yield. Second, of a plurality of magnetic heads designed to have an optical track width of 120 nm and fabricated out of a single substructure, the percentage of those satisfying the requirement that the effective track width be 150 nm or smaller was defined as MWW yield. Third, of a plurality of magnetic heads fabricated out of a single substructure, the percentage of those satisfying both of the requirement that the overwrite property be −25 dB or lower and the requirement that the effective track width be 150 nm or smaller was defined as overall yield.

Figure 40:
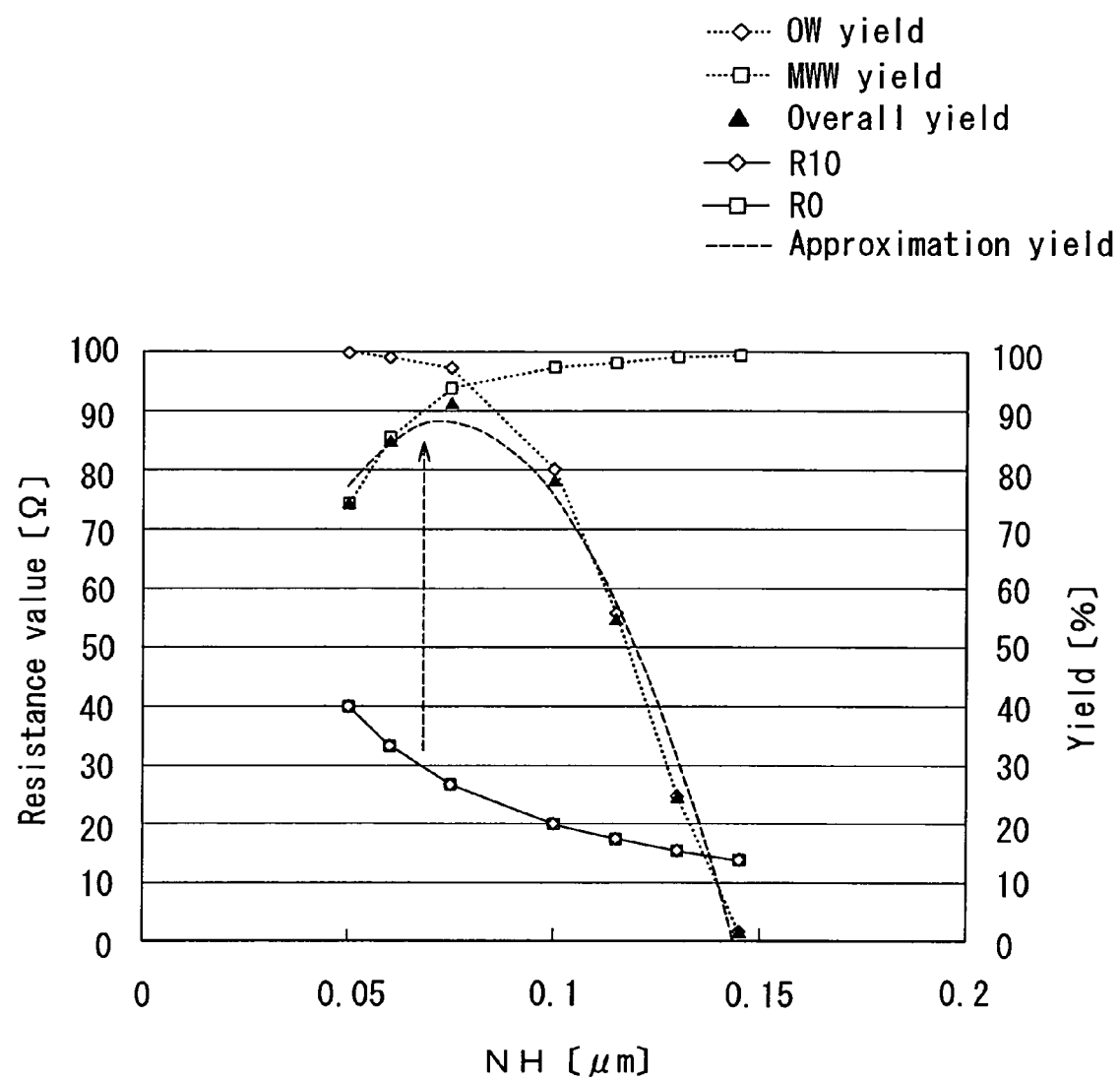
FIG. 40 is a plot illustrating the results of the first experiment.

In the first experiment, first, using a plurality of substructures of the comparative example fabricated as designed, the medium facing surfaces 40 were formed such that NH differed among the substructures. Similarly, using a plurality of substructures 100 according to the embodiment fabricated as designed, the medium facing surfaces 40 were formed such that NH differed among the substructures 100. Then, relationships with the above-mentioned three types of yields were determined for each of NH, the resistance value R10 of the sensor 150 when the medium facing surfaces 40 were formed, and the resistance value R0 of the composite sensor 50 when the medium facing surfaces 40 were formed. The results are shown in FIG. 40. In FIG. 40 the curve of the "approximation yield" indicated with a broken line shows changes in overall yield with respect to changes in NH expressed using an approximate expression.

As shown in FIG. 40, as NH decreases, the resistance values R10 and R0 increase, the OW yield increases and the MWW yield decreases. The overall yield is maximum when NH is of a specific value, and decreases when NH is of another value either greater or smaller than the specific value. This indicates that it is possible to make the overall yield maximum or nearly maximum by forming the medium facing surfaces 40 while performing control so that each of the resistance values R10 and R0 is a specific value. According to the example shown in FIG. 40, in the case of using the substructure of the comparative example, it is possible to make the overall yield maximum or nearly maximum by forming the medium facing surfaces 40 while performing control so that, for example, the resistance value R10 is 30 Ω, so as to achieve the desired value of NH. According to the example shown in FIG. 40, on the other hand, in the case of using the substructure 100 according to the embodiment, it is possible to make the overall yield maximum or nearly maximum by forming the medium facing surfaces 40 while performing control so that the resistance value R0 is approximately 30 Ω.

In the second experiment, employed were a plurality of substructures of a comparative example fabricated such that the portion of the pole layer 24 defining NH was properly located at the position predetermined by design while the portion of the pole layer 24 defining PTS was shifted from the position predetermined by design to become closer to the plane ABS by 0.05 μm, and the medium facing surfaces 40 were formed such that NH differed among the substructures. Similarly, employed were a plurality of substructures 100 according to the embodiment fabricated such that the portion of the pole layer 24 defining NH was properly located at the position predetermined by design while the portion of the pole layer 24 defining PTS was shifted from the position predetermined by design to become closer to the plane ABS by 0.05 μm, and the medium facing surfaces 40 were formed such that NH differed among the substructures 100.

Figure 41:
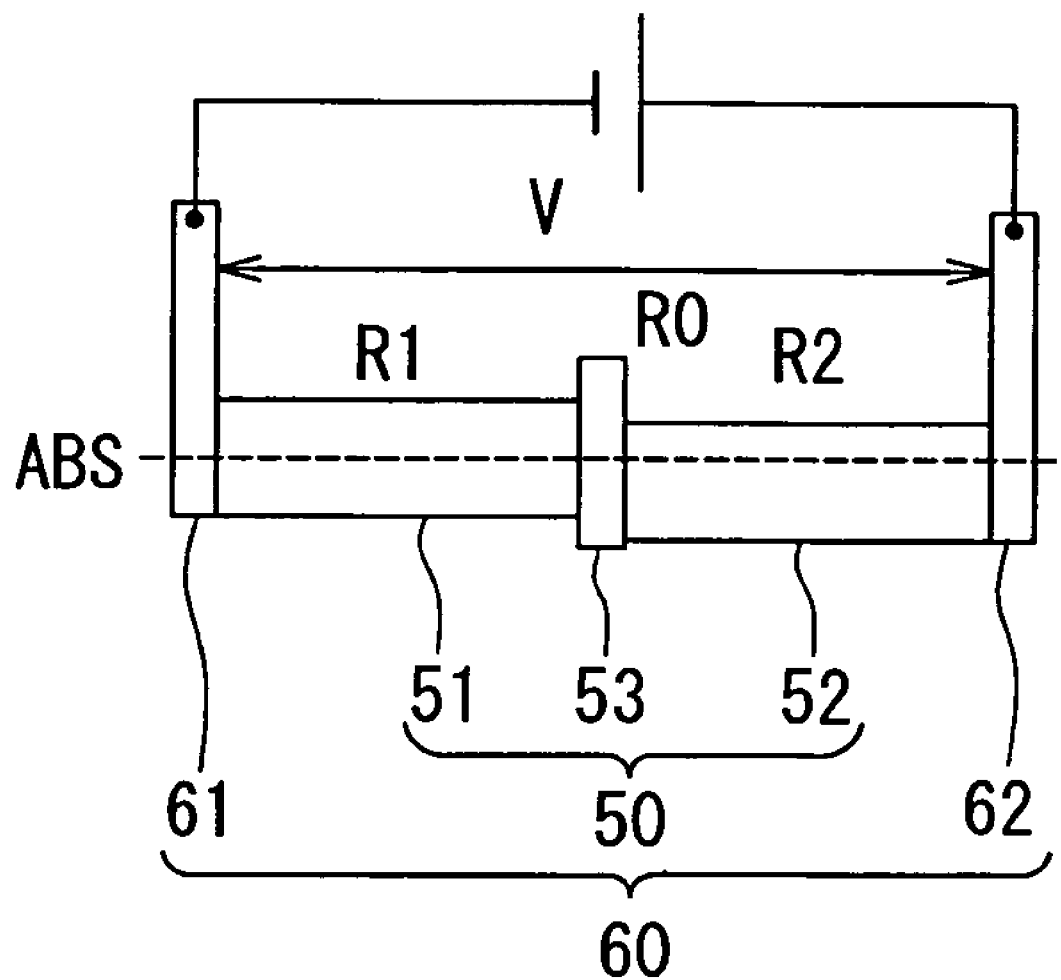
FIG. 41 is an explanatory view illustrating a sensor assembly used in a second experiment.

FIG. 41 illustrates the sensor assembly 60 in the substructures 100 used in the second experiment. In this sensor assembly 60, the sensor 51 is properly located at the position predetermined by design, whereas the position of the sensor 52 is shifted in the same direction by the same distance as the shift of the position of the portion defining PTS.

Figure 42:
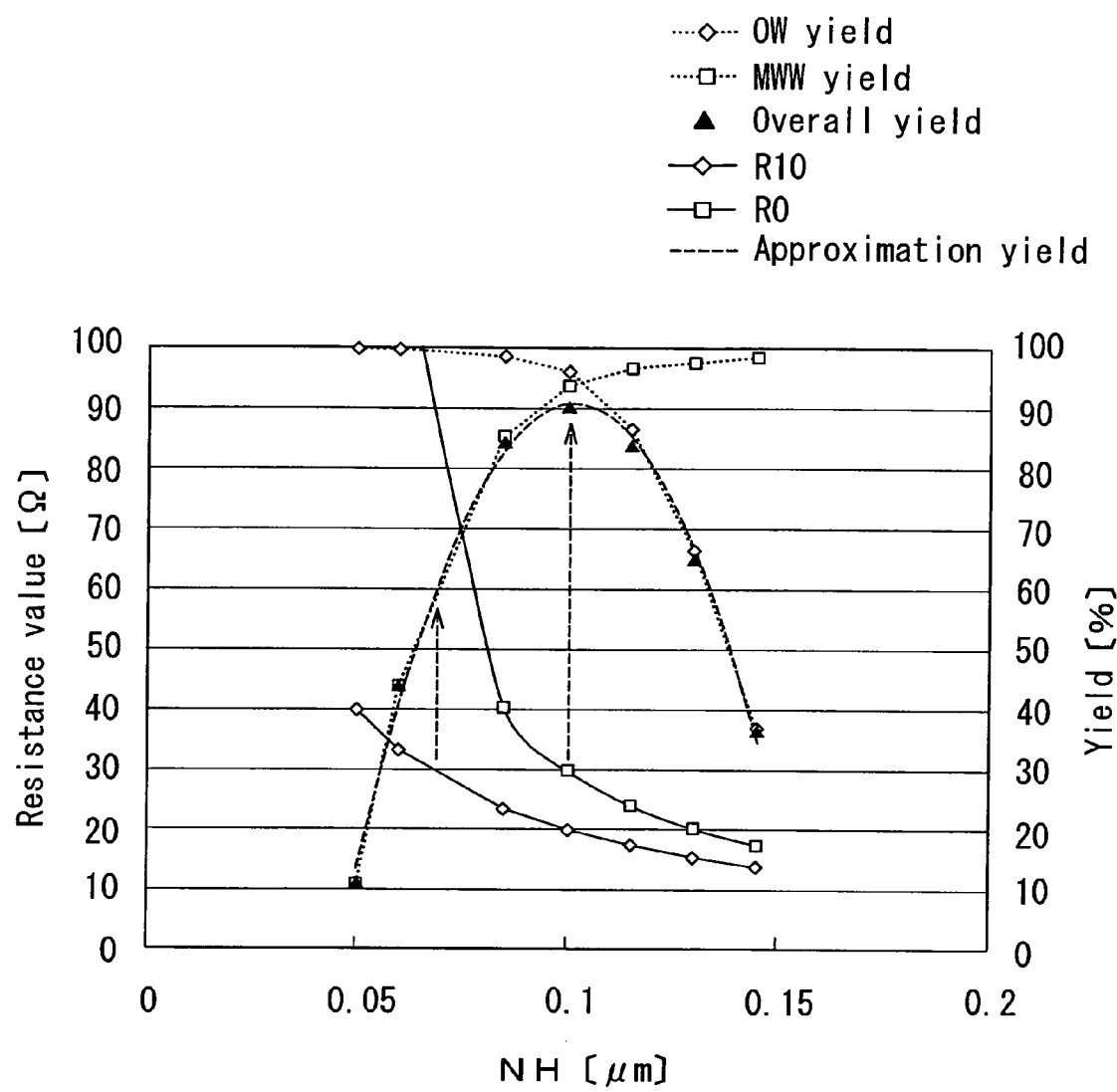
FIG. 42 is a plot illustrating the results of the second experiment.

In the second experiment, as in the first experiment, relationships with the three types of yields were determined for each of NH, the resistance value R10 of the sensor 150 when the medium facing surfaces 40 were formed, and the resistance value R0 of the composite sensor 50 when the medium facing surfaces 40 were formed, using the plurality of substructures of the comparative example and the plurality of substructures 100 according to the embodiment described above. The results are shown in FIG. 42. In FIG. 42 the curve of the "approximation yield" indicated with a broken line shows changes in overall yield with respect to changes in NH expressed using an approximate expression.

In FIG. 42, the curve showing changes in OW yield with respect to changes in NH, the curve showing changes in MWW yield with respect to changes in NH, and the curve showing changes in overall yield with respect to changes in NH are each shifted toward the right side, i.e., in the direction in which NH increases, compared with the corresponding curves in FIG. 40. Furthermore, in the second experiment, the value of NH at which the overall yield becomes maximum is greater than that in the first experiment. These are each attributable to the shift of the portion of the pole layer 24 defining PTS from the position predetermined by design to be closer to the plane ABS. Specifically, in the case of the second experiment, if compared with the case of the first experiment with the value of NH fixed, PTS is smaller than in the case of the first experiment, and as a result, the overwrite property improves while the effective track width increases.

In the case of forming the medium facing surfaces 40 using the substructure of the comparative example of the first experiment, as discussed above, it is possible to make the overall yield maximum or nearly maximum by forming the medium facing surfaces 40 while performing control so that, for example, the resistance value R10 is 30 Ω so as to achieve the desired value of NH. However, in the case of forming the medium facing surfaces 40 using the substructure of the comparative example of the second experiment, the overall yield greatly decreases if the medium facing surfaces 40 are formed while performing control so that, for example, the resistance value R10 is 30 Ω so as to achieve the desired value of NH.

In contrast, in the case of forming the medium facing surfaces 40 using the substructure 100 according to the embodiment used in the second experiment, it is possible to make the overall yield maximum or nearly maximum by forming the medium facing surfaces 40 while performing control so that the resistance value R0 is 30 Ω. The reasons are as follows. As shown in FIG. 41, in the second experiment, the position of the sensor 52 is shifted in the same direction by the same distance as the shift of the position of the portion defining PTS. Because of this, if comparison is made between the first and second experiments with regard to the case where the medium facing surfaces 40 are formed while performing control so that the resistance value R0 is 30 Ω, the resistance value R2 of the sensor 52 in the second experiment is higher than that in the first experiment, and accordingly the resistance value R1 of the sensor 51 in the second experiment is lower than that in the first experiment. A lower resistance value R1 means a greater NH. Therefore, in the second experiment NH increases, and consequently the overall yield increases, compared with the first experiment.

In the first experiment, the overall yield was 92% when the medium facing surfaces 40 were formed using the substructures of the comparative example while performing control so that the resistance value R10 was 30 Ω. In the first experiment, the overall yield was 92% also when the medium facing surfaces 40 were formed using the substructures 100 according to the embodiment while performing control so that the resistance value R0 was 30 Ω.

In contrast, in the second experiment, the overall yield was 65% when the medium facing surfaces 40 were formed using the substructures of the comparative example while performing control so that the resistance value R10 was 30 Ω. In the second experiment, on the other hand, the overall yield was 90% when the medium facing surfaces 40 were formed using the substructures 100 according to the embodiment while performing control so that the resistance value R0 was 30 Ω.

Next, consideration will be given to a case where the portion of the pole layer 24 defining NH is properly located at the position predetermined by design while the portion of the pole layer 24 defining PTS is shifted from the position predetermined by design to become farther from the plane ABS. In this case, in the sensor assembly 60 in the substructure 100 according to the embodiment, the position of the sensor 52 is shifted in a direction opposite to the direction of the shift of the sensor 52 of FIG. 41. In this case, if compared with the case of the first experiment with the value of NH fixed, PTS is greater than in the case of the first experiment, and as a result, the effective track width decreases while the overwrite property degrades. Consequently, the value of NH at which the overall yield becomes maximum is smaller than that in the first experiment.

In this case, if the medium facing surfaces 40 are formed using the substructure 100 according to the embodiment while performing control so that the resistance value R0 is 30 Ω, the resistance value R2 of the sensor 52 becomes lower than that in first experiment, and accordingly the resistance value R1 of the sensor 51 becomes higher than that in the first experiment. A higher resistance value R1 means a smaller NH. Therefore, in this case, compared with the case of the first experiment, NH decreases, and consequently the overall yield increases.

The foregoing description has been given with reference to the case where the portion of the pole layer 24 defining NH is properly located at the position predetermined by design while the portion of the pole layer 24 defining PTS is shifted from the position predetermined by design. The foregoing description, however, generally applies to cases where at least one of the portion of the pole layer 24 defining PTS and the portion of the pole layer 24 defining NH is shifted from the position predetermined by design and consequently the relative positional relationship between the sensor 51 and the sensor 52 deviates from the relationship of FIG. 39.

As has been described, in the embodiment, there are provided the sensor 51 that shows the resistance value R1 as the individual sensor value corresponding to the value of NH, and the sensor 52 that shows the resistance value R2 as the individual sensor value corresponding to the value of PTS. In the embodiment, the medium facing surfaces 40 are formed such that the resistance value R0 of the composite sensor 50, which is the composite sensor value dependent on the resistance values R1 and R2 of the sensors 51 and 52, becomes a predetermined value. Consequently, according to the embodiment, it is possible to improve the yield (overall yield) of the magnetic head in which there are different parameters NH and PTS each of which has an influence on the characteristics of the magnetic head relating to the pole layer 24 and each of which depends on the position of the medium facing surface 40.

Figure 43:
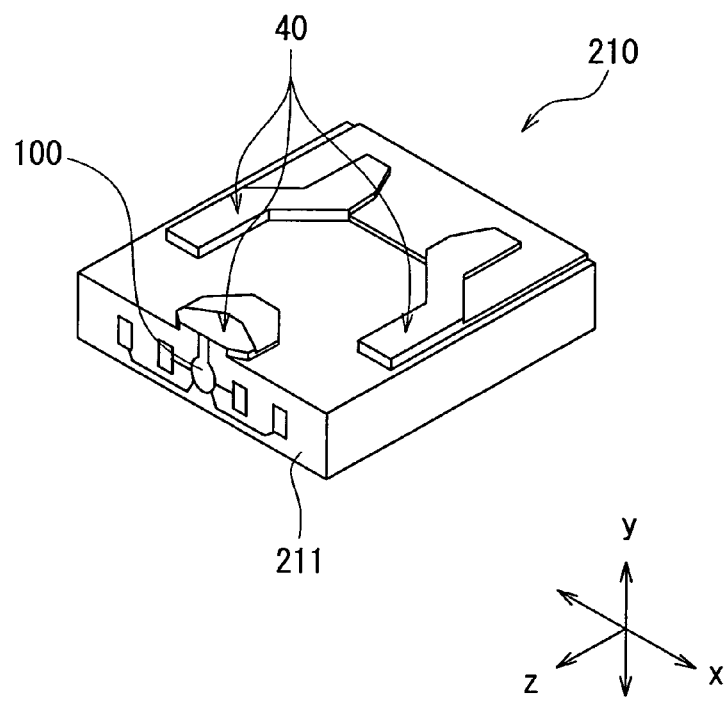
FIG. 43 is a perspective view illustrating an example of the outer appearance of a slider including the magnetic head of the embodiment of the invention.

A head assembly and a magnetic disk drive each incorporating the magnetic head of the embodiment will now be described. Reference is now made to FIG. 43 to describe a slider 210 included in the head assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 35 of FIG. 4. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 43, an airflow passes between the magnetic disk platter and the slider 210, and a lift is thereby generated below the slider 210 in the y direction of FIG. 43 and exerted on the slider 210. The slider 210 is configured to fly over the surface of the magnetic disk platter by means of the lift. The x direction of FIG. 43 is across the tracks of the magnetic disk platter. The thin-film magnetic head 100 of the embodiment is formed near the air-outflow-side end (the end located at the lower left of FIG. 43) of the slider 210.

Figure 44:
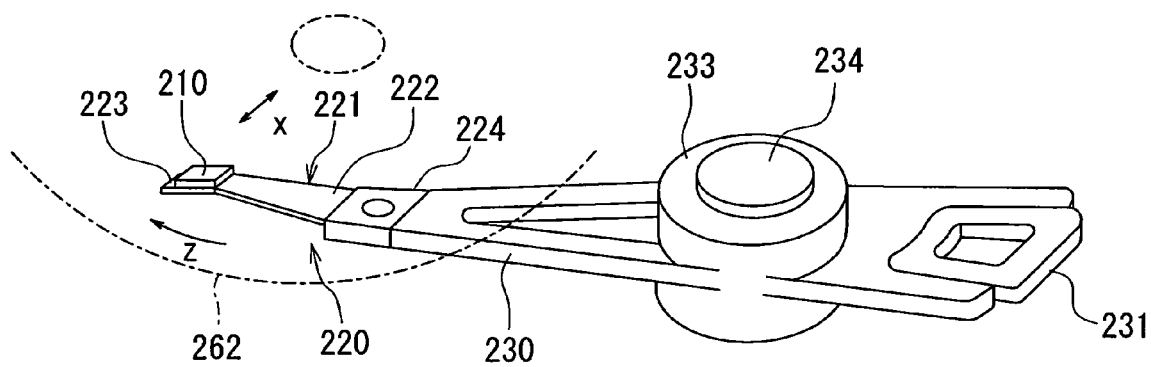
FIG. 44 is a perspective view of a head arm assembly of the embodiment of the invention.

Reference is now made to FIG. 44 to describe the head assembly. The head assembly has the slider 210 and a supporter that flexibly supports the slider 210. Modes of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 44 illustrates a head arm assembly. In this head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 45:
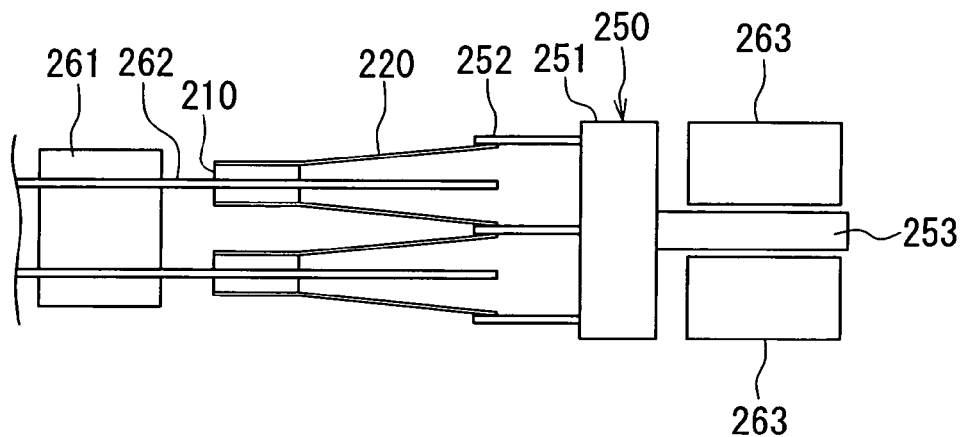
FIG. 45 is an explanatory view for illustrating a main part of a magnetic disk drive of the embodiment of the invention.
Figure 46:
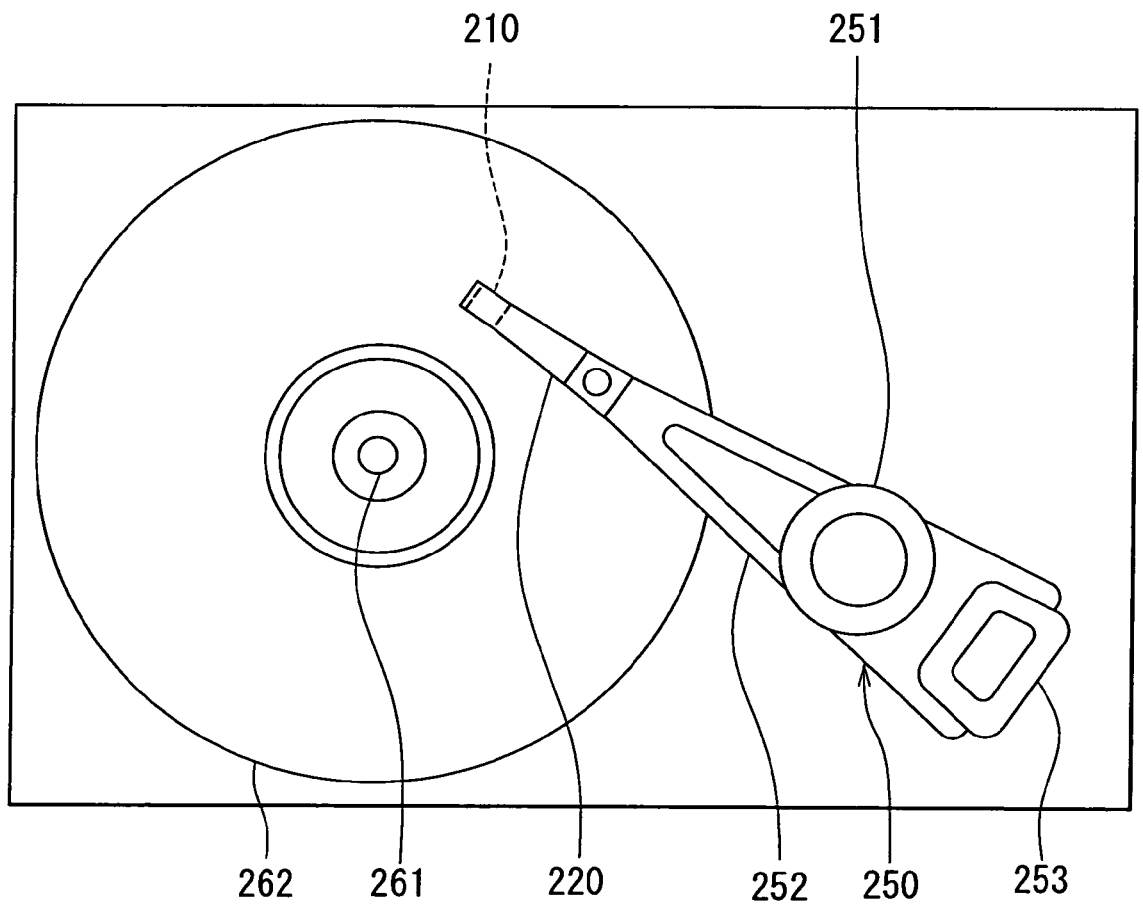
FIG. 46 is a top view of the magnetic disk drive of the embodiment of the invention.

Reference is now made to FIG. 45 and FIG. 46 to describe an example of the head stack assembly and the magnetic disk drive. FIG. 45 is an explanatory view illustrating a main part of the magnetic disk drive, and FIG. 46 is a top view of the magnetic disk drive. The head stack assembly 250 includes a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with the platter 262 located in between. The voice coil motor includes permanent magnets 263 disposed such that the magnets 263 are opposed to each other with the coil 253 of the head stack assembly 250 located therebetween. The actuator and the head stack assembly 250 except the sliders 210 support the sliders 210 and align them with respect to the magnetic disk platters 262.

In the magnetic disk drive, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The present invention is not limited to the foregoing embodiment but can be carried out in various modifications. For example, in the foregoing embodiment the sensor assemblies 60 are disposed in the portions of the substructure 100 that will not remain in the magnetic heads. In the present invention, however, each sensor assembly 60 may be disposed such that a portion thereof will remain in the magnetic head, specifically, each sensor assembly 60 may be disposed to lie across a pre-head portion 101 and a part of an inter-row removal-intended portion 102 adjacent thereto.

The foregoing embodiment has been described with reference to the case where NH and PTS are the plurality of different parameters each of which has an influence on the characteristics of the magnetic head relating to the pole layer 24 and each of which depends on the position of the medium facing surface 40. However, the present invention is also applicable to cases where the combination of the plurality of parameters is other than the combination of NH and PTS. Examples of possible combinations of the plurality of parameters include a combination of NH and TH (throat height), a combination of TH and PTS, and a combination of NH, PTS and TH. According to the present invention, irrespective of combination of the plurality of parameters, it is possible to improve the yield (overall yield) of the magnetic head by forming on the substructure 100 a plurality of sensors that respectively show individual sensor values corresponding to the values of the different parameters, and forming the medium facing surfaces such that the composite sensor value dependent on the plurality of sensor values shown by the plurality of sensors becomes a predetermined value.

Furthermore, the present invention is also applicable to cases where there is any parameter other than NH, PTS and TH, as a parameter that has an influence on the characteristics of the magnetic head relating to the pole layer 24 and that depends on the position of the medium facing surface 40. For example, in a case where the pole layer 24 is formed to have a first portion and a second portion by providing a stepped portion in the bottom surface of the pole layer 24 so that the bottom surface is not flat, the length of the first portion taken in the direction perpendicular to the medium facing surface 40 can be such a parameter.

Furthermore, while the composite sensor 50 is formed by connecting the sensors 51 and 52 in series in the foregoing embodiment, the composite sensor 50 may also be formed by connecting the sensors 51 and 52 in parallel. In this case, too, it is possible to provide functions and merits similar to those of the foregoing embodiment.

Furthermore, in the present invention, the degree of contribution of each individual sensor value to the composite sensor value or the degree of a change in composite sensor value in response to a change in each individual sensor value may be defined as desired by varying the shape, position, material and so on of each individual sensor. As a result, it is possible to provide a plurality of sensors adjusted so that a maximum or nearly maximum overall yield is achievable by forming the medium facing surfaces such that the composite sensor value becomes a predetermined value, even in a case where the degree of influence exerted by a change in parameter value on a change in overall yield varies from parameter to parameter.

In the foregoing embodiment, the sensors 51 and 52 are electrically connected in the substructure 100 to thereby form the composite sensor 50 showing the composite sensor value. In the present invention, however, such a configuration is also possible that the plurality of sensors are not electrically connected in the substructure 100 but the substructure 100 is provided with a plurality of terminals for outputting the individual sensor values of the sensors and the individual sensor values are received at the controller 386 of FIG. 37, for example, so as to determine the composite sensor value by computation using those values.

The present invention is applicable not only to magnetic heads for the perpendicular magnetic recording system but also to magnetic heads for the longitudinal magnetic recording system.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head substructure for use for manufacturing a magnetic head, the magnetic head comprising: a medium facing surface that faces toward a recording medium; a coil that generates a magnetic field corresponding to data to be written on the recording medium; and a pole layer that allows a magnetic flux corresponding to the magnetic field generated by the coil to pass therethrough and generates a write magnetic field for writing the data on the recording medium, the magnetic head substructure comprising:

a substrate; and a plurality of sets of the coil and pole layer formed on the substrate so that a plurality of pre-head portions each of which is to become the magnetic head later are aligned in a plurality of rows, the magnetic head substructure being intended to be used such that it is cut later to separate the plurality of pre-head portions from one another, and a surface formed by cutting the substructure is lapped to thereby form the medium facing surfaces, the magnetic head substructure further comprising a plurality of sensors that respectively show individual sensor values corresponding to values of a plurality of different parameters each of which has an influence on characteristics of the magnetic head relating to the pole layer and each of which depends on a position of the medium facing surface, wherein:

the plurality of sensors respectively show resistance values each of which varies according to the position of the medium facing surface, as the individual sensor values;

the plurality of sensors are electrically connected to each other to form a composite sensor that shows a composite sensor value; and the composite sensor shows a resistance value that depends on the resistance values of the plurality of sensors, as the composite sensor value.

2. The magnetic head substructure according to claim 1, wherein:

the magnetic head includes a plurality of portions relating to the values of the respective parameters; and a position of each of the plurality of sensors is associated with the position of the portion relating to the value of the parameter corresponding to the sensor.

3. The magnetic head substructure according to claim 1, wherein:

the pole layer includes: a track width defining portion including a first end located in the medium facing surface and a second end located away from the medium facing surface, the track width defining portion having a width that defines an optical track width; and a wide portion coupled to the second end of the track width defining portion and having a width greater than that of the track width defining portion; and one of the plurality of parameters is a length of the track width defining portion taken in a direction perpendicular to the medium facing surface.

4. The magnetic head substructure according to claim 1, wherein:

the pole layer includes: a first portion including a first end located in the medium facing surface and a second end located away from the medium facing surface; and a second portion that is coupled to the second end of the first portion and that is greater than the first portion in a dimension taken in a direction parallel to the medium facing surface and perpendicular to a track width direction; and one of the plurality of parameters is a length of the first portion taken in a direction perpendicular to the medium facing surface.

5. The magnetic head substructure according to claim 1, wherein the magnetic head is one for use for a perpendicular magnetic recording system.

* * * * *